US012739072B2

(12) United States Patent
Ly et al.

(10) Patent No.: US 12,739,072 B2
(45) Date of Patent: Sep. 15, 2026

(54) PHASE TRACKING REFERENCE SIGNALS AND DEMODULATION REFERENCE SIGNALS FOR JOINT CHANNEL ESTIMATION

(71) Applicant: QUALCOMM Incorporated, San Diego, CA (US)

(72) Inventors: Hung Dinh Ly, San Diego, CA (US); Mostafa Khoshnevisan, San Diego, CA (US); Mahmoud Taherzadeh Boroujeni, San Diego, CA (US); Gokul Sridharan, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 641 days.

(21) Appl. No.: 17/732,462

(22) Filed: Apr. 28, 2022

(65) Prior Publication Data

US 2022/0360394 A1 Nov. 10, 2022

Related U.S. Application Data

(60) Provisional application No. 63/182,502, filed on Apr. 30, 2021.

(51) Int. Cl.

*H04W 72/23* (2023.01)
*H04L 5/00* (2006.01)
*H04L 25/02* (2006.01)

(52) U.S. Cl.

CPC ........ *H04L 5/0048* (2013.01); *H04L 25/0224* (2013.01); *H04W 72/23* (2023.01)

(58) Field of Classification Search

CPC ... H04L 5/0041; H04L 5/0044; H04L 5/0048; H04L 5/0096; H04W 72/042; H04W 72/0446; H04W 72/20; H04W 72/23

USPC ........................................ 370/252, 329, 330

See application file for complete search history.

(56) References Cited

U.S. PATENT DOCUMENTS

2022/0224456 A1* 7/2022 Yi ........................ H04W 72/23

FOREIGN PATENT DOCUMENTS

WO WO-2022031919 A1 * 2/2022 .......... H04L 5/0044

* cited by examiner

*Primary Examiner* — Harun Chowdhury
(74) *Attorney, Agent, or Firm* — Holland & Hart LLP

(57) ABSTRACT

Methods, systems, and devices for wireless communications are described. Generally, a network entity may configure a user equipment (UE) with transmission time interval (TTI) format information, and the UE may determine time domain windows for joint channel estimation based thereon. The network entity may also configure the UE with an association between one or more demodulation reference signal (DMRS) ports and one or more phase-tracking reference signal (PTRS) ports. The UE may maintain phase continuity across physical uplink channel transmissions within a time domain window in which a PTRS is scheduled when DMRS and PTRS are transmitted via the associated DMRS and PTRS ports (e.g., when the PTRS-DMRS association is identical across the time domain window). In some cases, the UE may not maintain phase continuity across multiple physical uplink channel transmissions occurring within a time domain window when a PTRS is also scheduled within the time domain window.

20 Claims, 18 Drawing Sheets

1100

Figure 15:
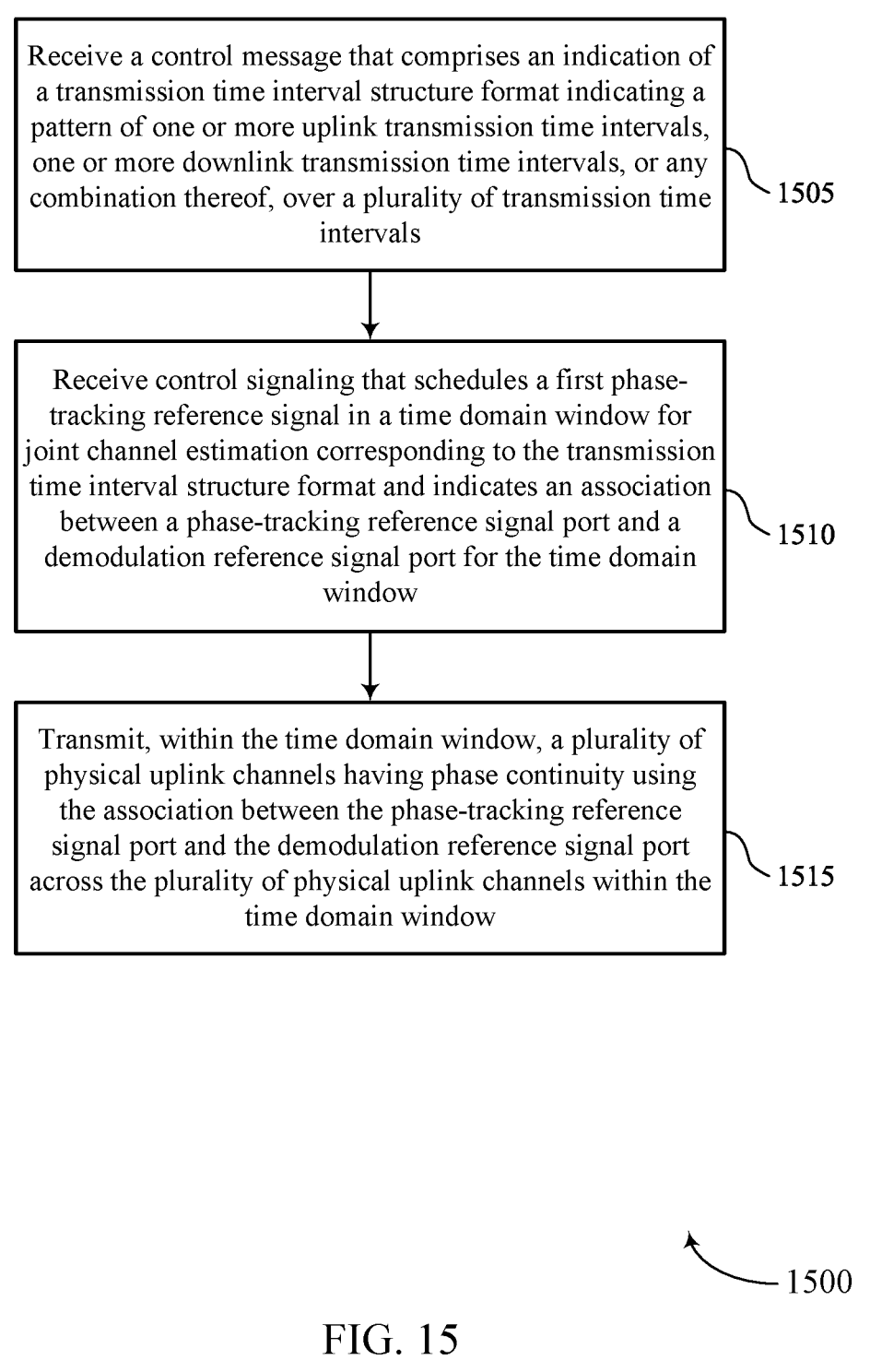

Receive a control message that comprises an indication of a transmission time interval structure format indicating a pattern of one or more uplink transmission time intervals, one or more downlink transmission time intervals, or any combination thereof, over a plurality of transmission time intervals

1505

Receive control signaling that schedules a first phase-tracking reference signal in a time domain window for joint channel estimation corresponding to the transmission time interval structure format and indicates an association between a phase-tracking reference signal port and a demodulation reference signal port for the time domain window

1510

Transmit, within the time domain window, a plurality of physical uplink channels having phase continuity using the association between the phase-tracking reference signal port and the demodulation reference signal port across the plurality of physical uplink channels within the time domain window

Figure 16:
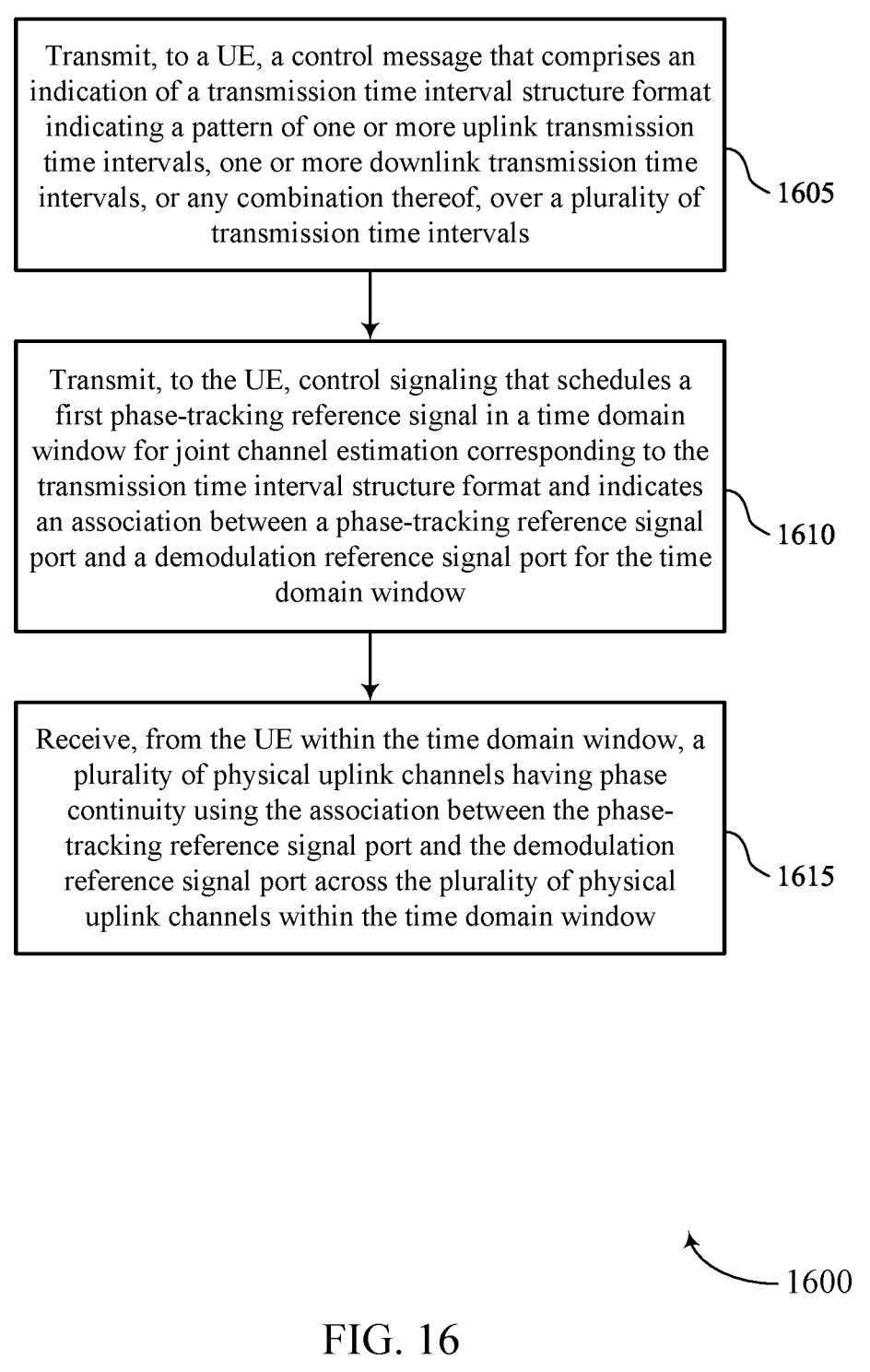

Transmit, to a UE, a control message that comprises an indication of a transmission time interval structure format indicating a pattern of one or more uplink transmission time intervals, one or more downlink transmission time intervals, or any combination thereof, over a plurality of transmission time intervals

1605

Transmit, to the UE, control signaling that schedules a first phase-tracking reference signal in a time domain window for joint channel estimation corresponding to the transmission time interval structure format and indicates an association between a phase-tracking reference signal port and a demodulation reference signal port for the time domain window

1610

Receive, from the UE within the time domain window, a plurality of physical uplink channels having phase continuity using the association between the phase-tracking reference signal port and the demodulation reference signal port across the plurality of physical uplink channels within the time domain window

PHASE TRACKING REFERENCE SIGNALS AND DEMODULATION REFERENCE SIGNALS FOR JOINT CHANNEL ESTIMATION

CROSS REFERENCE

The present Application for Patent claims the benefit of U.S. Provisional Patent Application No. 63/182,502 by LY et al., entitled "PHASE TRACKING REFERENCE SIGNALS AND DEMODULATION REFERENCE SIGNALS FOR JOINT CHANNEL ESTIMATION," filed Apr. 30, 2021, assigned to the assignee hereof, and expressly incorporated by reference herein.

FIELD OF TECHNOLOGY

The following relates to wireless communications, including phase tracking reference signals and demodulation reference signals for joint channel estimation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more network entities or one or more network access nodes, each simultaneously supporting communication for multiple communication devices, which may be otherwise known as user equipment (UE).

SUMMARY

The described techniques relate to improved methods, systems, devices, and apparatuses that support phase tracking reference signals and demodulation reference signals for joint channel estimation. Generally, a user equipment (UE) may determine one or more time domain windows for joint channel estimation (e.g., during which the UE may be capable of maintaining phase continuity). The UE may transmit phase-tracking reference signals (PTRS) to permit a receiving wireless device, such as a network entity, to track and identify phase errors across time (e.g., within a transmission time interval (TTI) or across multiple TTIs). However, cases where PTRSs are transmitted may correspond to scenarios with high phase error (e.g., cases where maintaining phase continuity is difficult or impossible). Some wireless communication systems may not support techniques for determining whether to perform joint channel estimation (e.g., demodulation reference signal (DMRS) bundling) during time domain windows in which PTRSs are scheduled.

Techniques are described for controlling whether a UE is to maintain phase continuity across multiple physical uplink channel transmissions occurring within a time domain window based on whether a PTRS is also scheduled within the time domain window. A network entity may configure the UE with TTI format information (e.g., a frequency division multiplexing (FDM) configuration, a time division multiplexing (TDD) configuration, or the like), and the UE may determine time domain windows for joint channel estimation based thereon. The network entity may also configure the UE with an association between one or more DMRS ports and one or more PTRS ports. In such examples, the UE may maintain phase continuity across the physical uplink channel transmissions within a time domain window in which a PTRS is scheduled when DMRS and PTRS are transmitted via the associated DMRS port and PTRS port (e.g., when the PTRS-DMRS association is identical across the time domain window).

In some cases, the UE may not maintain phase continuity across multiple physical uplink channel transmissions occurring within a time domain window when a PTRS is also scheduled within the time domain window. Whether a PTRS is scheduled in a time domain window may be used to control when the UE is to maintain phase continuity across multiple physical uplink channel transmissions occurring within the time domain window. In such examples, the UE may maintain phase continuity in time domain windows in which no PTRSs are scheduled, and may not maintain phase continuity during time domain windows in which PTRSs are scheduled.

A method for wireless communications at a user equipment is described. The method may include receiving a control message that includes an indication of a transmission time interval structure format indicating a pattern of one or more uplink transmission time intervals, one or more downlink transmission time intervals, or any combination thereof, over a set of multiple transmission time intervals, receiving control signaling that schedules a first phase-tracking reference signal in a time domain window for joint channel estimation corresponding to the transmission time interval structure format and indicates an association between a phase-tracking reference signal port and a demodulation reference signal port for the time domain window, and transmitting, within the time domain window, a set of multiple physical uplink channels having phase continuity using the association between the phase-tracking reference signal port and the demodulation reference signal port across the set of multiple physical uplink channels within the time domain window.

An apparatus for wireless communications at a user equipment is described. The apparatus may include a processor, memory coupled with the processor, and instructions stored in the memory. The instructions may be executable by the processor to cause the apparatus to receive a control message that includes an indication of a transmission time interval structure format indicating a pattern of one or more uplink transmission time intervals, one or more downlink transmission time intervals, or any combination thereof, over a set of multiple transmission time intervals, receive control signaling that schedules a first phase-tracking reference signal in a time domain window for joint channel estimation corresponding to the transmission time interval structure format and indicates an association between a phase-tracking reference signal port and a demodulation reference signal port for the time domain window, and transmit, within the time domain window, a set of multiple physical uplink channels having phase continuity using the association between the phase-tracking reference signal port and the demodulation reference signal port across the set of multiple physical uplink channels within the time domain window.

Another apparatus for wireless communications at a user equipment is described. The apparatus may include means for receiving a control message that includes an indication of a transmission time interval structure format indicating a pattern of one or more uplink transmission time intervals, one or more downlink transmission time intervals, or any combination thereof, over a set of multiple transmission time intervals, means for receiving control signaling that schedules a first phase-tracking reference signal in a time domain window for joint channel estimation corresponding to the transmission time interval structure format and indicates an association between a phase-tracking reference signal port and a demodulation reference signal port for the time domain window, and means for transmitting, within the time domain window, a set of multiple physical uplink channels having phase continuity using the association between the phase-tracking reference signal port and the demodulation reference signal port across the set of multiple physical uplink channels within the time domain window.

A non-transitory computer-readable medium storing code for wireless communications at a user equipment is described. The code may include instructions executable by a processor to receive a control message that includes an indication of a transmission time interval structure format indicating a pattern of one or more uplink transmission time intervals, one or more downlink transmission time intervals, or any combination thereof, over a set of multiple transmission time intervals, receive control signaling that schedules a first phase-tracking reference signal in a time domain window for joint channel estimation corresponding to the transmission time interval structure format and indicates an association between a phase-tracking reference signal port and a demodulation reference signal port for the time domain window, and transmit, within the time domain window, a set of multiple physical uplink channels having phase continuity using the association between the phase-tracking reference signal port and the demodulation reference signal port across the set of multiple physical uplink channels within the time domain window.

In some examples of the method, apparatuses, and non-transitory computer-readable medium described herein, receiving the control signaling may include operations, features, means, or instructions for receiving a downlink control information message including an indication of the association between the phase-tracking reference signal port and the demodulation reference signal port for the time domain window.

In some examples of the method, apparatuses, and non-transitory computer-readable medium described herein, the transmitting may include operations, features, means, or instructions for transmitting, using the association, a set of multiple demodulation reference signals via a demodulation reference signal port and a set of multiple phase-tracking reference signals via the phase-tracking reference signal port across the set of multiple physical uplink channels having phase continuity within the time domain window.

Some examples of the method, apparatuses, and non-transitory computer-readable medium described herein may further include operations, features, means, or instructions for receiving the control signaling including an indication of a bandwidth part associated with the set of multiple physical uplink channels and transmitting, within the time domain window, a set of multiple phase-tracking reference signals including the first phase-tracking reference signal in accordance with a frequency domain density corresponding to the bandwidth part.

Some examples of the method, apparatuses, and non-transitory computer-readable medium described herein may further include operations, features, means, or instructions for receiving the control signaling including an indication of a modulation and coding scheme associated with the set of multiple physical uplink channels and transmitting a set of multiple phase-tracking reference signals including the first phase-tracking reference signal in accordance with a time domain density corresponding to the modulation and coding scheme.

In some examples of the method, apparatuses, and non-transitory computer-readable medium described herein, receiving the control signaling that schedules the first phase-tracking reference signal in the time domain window may include operations, features, means, or instructions for receiving an indication of one or more demodulation reference signal occasions in the time domain window and transmitting, within the time domain window, a set of multiple phase-tracking reference signals including the first phase-tracking reference signal in accordance with a phase-tracking reference signal repetition counter that may be reset at each occasion of the one or more demodulation reference signal occasions.

In some examples of the method, apparatuses, and non-transitory computer-readable medium described herein, transmitting the set of multiple physical uplink channels may include operations, features, means, or instructions for transmitting the set of multiple physical uplink channels as a set of multiple repetitions of a same physical uplink channel.

In some examples of the method, apparatuses, and non-transitory computer-readable medium described herein, transmitting the set of multiple physical uplink channels may include operations, features, means, or instructions for transmitting the set of multiple physical uplink channels including a first physical uplink channel scheduled by a first downlink control information message and a second physical uplink channel scheduled by a second downlink control information message, where the first physical uplink channel may be different than the second physical uplink channel.

In some examples of the method, apparatuses, and non-transitory computer-readable medium described herein, the set of multiple physical uplink channels may include operations, features, means, or instructions for one or more physical uplink shared channels, one or more physical uplink control channels, or a combination thereof.

Some examples of the method, apparatuses, and non-transitory computer-readable medium described herein may further include operations, features, means, or instructions for identifying a set of multiple time domain windows for joint channel estimation based on the transmission time interval structure format.

A method for wireless communications at a network entity is described. The method may include transmitting, to a user equipment (UE), a control message that includes an indication of a transmission time interval structure format indicating a pattern of one or more uplink transmission time intervals, one or more downlink transmission time intervals, or any combination thereof, over a set of multiple transmission time intervals, transmitting, to the UE, control signaling that schedules a first phase-tracking reference signal in a time domain window for joint channel estimation corresponding to the transmission time interval structure format and indicates an association between a phase-tracking reference signal port and a demodulation reference signal port for the time domain window, and receiving, from the UE within the time domain window, a set of multiple physical uplink channels having phase continuity using the association between the phase-tracking reference signal port and the demodulation reference signal port across the set of multiple physical uplink channels within the time domain window.

An apparatus for wireless communications at a network entity is described. The apparatus may include a processor, memory coupled with the processor, and instructions stored in the memory. The instructions may be executable by the processor to cause the apparatus to transmit, to a UE, a control message that includes an indication of a transmission time interval structure format indicating a pattern of one or more uplink transmission time intervals, one or more downlink transmission time intervals, or any combination thereof, over a set of multiple transmission time intervals, transmit, to the UE, control signaling that schedules a first phase-tracking reference signal in a time domain window for joint channel estimation corresponding to the transmission time interval structure format and indicates an association between a phase-tracking reference signal port and a demodulation reference signal port for the time domain window, and receive, from the UE within the time domain window, a set of multiple physical uplink channels having phase continuity using the association between the phase-tracking reference signal port and the demodulation reference signal port across the set of multiple physical uplink channels within the time domain window.

Another apparatus for wireless communications at a network entity is described. The apparatus may include means for transmitting, to a UE, a control message that includes an indication of a transmission time interval structure format indicating a pattern of one or more uplink transmission time intervals, one or more downlink transmission time intervals, or any combination thereof, over a set of multiple transmission time intervals, means for transmitting, to the UE, control signaling that schedules a first phase-tracking reference signal in a time domain window for joint channel estimation corresponding to the transmission time interval structure format and indicates an association between a phase-tracking reference signal port and a demodulation reference signal port for the time domain window, and means for receiving, from the UE within the time domain window, a set of multiple physical uplink channels having phase continuity using the association between the phase-tracking reference signal port and the demodulation reference signal port across the set of multiple physical uplink channels within the time domain window.

A non-transitory computer-readable medium storing code for wireless communications at a network entity is described. The code may include instructions executable by a processor to transmit, to a UE, a control message that includes an indication of a transmission time interval structure format indicating a pattern of one or more uplink transmission time intervals, one or more downlink transmission time intervals, or any combination thereof, over a set of multiple transmission time intervals, transmit, to the UE, control signaling that schedules a first phase-tracking reference signal in a time domain window for joint channel estimation corresponding to the transmission time interval structure format and indicates an association between a phase-tracking reference signal port and a demodulation reference signal port for the time domain window, and receive, from the UE within the time domain window, a set of multiple physical uplink channels having phase continuity using the association between the phase-tracking reference signal port and the demodulation reference signal port across the set of multiple physical uplink channels within the time domain window.

Some examples of the method, apparatuses, and non-transitory computer-readable medium described herein may further include operations, features, means, or instructions for receiving, from the UE, a set of multiple demodulation reference signals over a set of multiple different transmission time intervals within the time domain window, estimating a phase error based on the first phase-tracking reference signal, determining a joint channel estimate based on the estimated phase error and the set of multiple demodulation reference signals, and demodulating the set of multiple physical uplink channels based on the joint channel estimate.

In some examples of the method, apparatuses, and non-transitory computer-readable medium described herein, transmitting the control signaling may include operations, features, means, or instructions for transmitting a downlink control message including an indication of the association between the phase-tracking reference signal port and the demodulation reference signal port for the time domain window.

Some examples of the method, apparatuses, and non-transitory computer-readable medium described herein may further include operations, features, means, or instructions for receiving, using the association, a set of multiple demodulation reference signals via a demodulation reference signal port and a set of multiple phase-tracking reference signals via the phase-tracking reference signal port across the set of multiple physical uplink channels having phase continuity within the time domain window.

Some examples of the method, apparatuses, and non-transitory computer-readable medium described herein may further include operations, features, means, or instructions for transmitting the control signaling including an indication of a bandwidth part associated with the set of multiple physical uplink channels and receiving, within the time domain window, a set of multiple phase-tracking reference signals including the first phase-tracking reference signal in accordance with a frequency domain density corresponding to the bandwidth part.

Some examples of the method, apparatuses, and non-transitory computer-readable medium described herein may further include operations, features, means, or instructions for transmitting the control signaling including an indication of a modulation and coding scheme associated with the set of multiple physical uplink channels and receiving a set of multiple phase-tracking reference signals including the first phase-tracking reference signal in accordance with a time domain density corresponding to the modulation and coding scheme.

In some examples of the method, apparatuses, and non-transitory computer-readable medium described herein, transmitting the control signaling that schedules the first phase-tracking reference signal in the time domain window may include operations, features, means, or instructions for transmitting an indication of one or more demodulation reference signal occasions in the time domain window and receiving, within the time domain window, a set of multiple phase-tracking reference signals including the first phase-tracking reference signal in accordance with a phase-tracking reference signal repetition counter that may be reset at each occasion of the one or more demodulation reference signal occasions.

In some examples of the method, apparatuses, and non-transitory computer-readable medium described herein, receiving the set of multiple physical uplink channels may include operations, features, means, or instructions for receiving the set of multiple physical uplink channels as a set of multiple repetitions of a single physical uplink channel.

In some examples of the method, apparatuses, and non-transitory computer-readable medium described herein, receiving the set of multiple physical uplink channels may include operations, features, means, or instructions for receiving the set of multiple physical uplink channels including a first physical uplink channel scheduled by a first downlink control information message and a second physical uplink channel scheduled by a second downlink control information message, where the first physical uplink channel may be different than the second physical uplink channel.

In some examples of the method, apparatuses, and non-transitory computer-readable medium described herein, the set of multiple physical uplink channels may include operations, features, means, or instructions for one or more physical uplink shared channels, one or more physical uplink control channels, or a combination thereof.

A method for wireless communications at a UE is described. The method may include receiving a control message that includes an indication of a transmission time interval structure format indicating a pattern of one or more uplink transmission time intervals, one or more downlink transmission time intervals, or any combination thereof, over a set of multiple transmission time intervals, receiving control signaling that schedules a first phase-tracking reference signal in a first time domain window for joint channel estimation corresponding to the transmission time interval structure format and that indicates a phase continuity configuration for the first time domain window, and transmitting a set of multiple physical uplink channels within the first time domain window in accordance with the phase continuity configuration.

An apparatus for wireless communications at a UE is described. The apparatus may include a processor, memory coupled with the processor, and instructions stored in the memory. The instructions may be executable by the processor to cause the apparatus to receive a control message that includes an indication of a transmission time interval structure format indicating a pattern of one or more uplink transmission time intervals, one or more downlink transmission time intervals, or any combination thereof, over a set of multiple transmission time intervals, receive control signaling that schedules a first phase-tracking reference signal in a first time domain window for joint channel estimation corresponding to the transmission time interval structure format and that indicates a phase continuity configuration for the first time domain window, and transmit a set of multiple physical uplink channels within the first time domain window in accordance with the phase continuity configuration.

Another apparatus for wireless communications at a UE is described. The apparatus may include means for receiving a control message that includes an indication of a transmission time interval structure format indicating a pattern of one or more uplink transmission time intervals, one or more downlink transmission time intervals, or any combination thereof, over a set of multiple transmission time intervals, means for receiving control signaling that schedules a first phase-tracking reference signal in a first time domain window for joint channel estimation corresponding to the transmission time interval structure format and that indicates a phase continuity configuration for the first time domain window, and means for transmitting a set of multiple physical uplink channels within the first time domain window in accordance with the phase continuity configuration.

A non-transitory computer-readable medium storing code for wireless communications at a UE is described. The code may include instructions executable by a processor to receive a control message that includes an indication of a transmission time interval structure format indicating a pattern of one or more uplink transmission time intervals, one or more downlink transmission time intervals, or any combination thereof, over a set of multiple transmission time intervals, receive control signaling that schedules a first phase-tracking reference signal in a first time domain window for joint channel estimation corresponding to the transmission time interval structure format and that indicates a phase continuity configuration for the first time domain window, and transmit a set of multiple physical uplink channels within the first time domain window in accordance with the phase continuity configuration.

In some examples of the method, apparatuses, and non-transitory computer-readable medium described herein, transmitting the set of multiple physical uplink channels may include operations, features, means, or instructions for transmitting, within the first time domain window, one or more of the set of multiple physical uplink channels without phase continuity based on the phase continuity configuration indicating that phase continuity may be disabled due to the first phase-tracking reference signal being scheduled within the first time domain window.

Some examples of the method, apparatuses, and non-transitory computer-readable medium described herein may further include operations, features, means, or instructions for transmitting a set of multiple demodulation reference signals associated with the set of multiple physical uplink channels and the one or more phase-tracking reference signals in the first time domain window.

Some examples of the method, apparatuses, and non-transitory computer-readable medium described herein may further include operations, features, means, or instructions for transmitting, within a second time domain window for joint channel estimation corresponding to the transmission time interval structure format, two or more of the set of multiple physical uplink channels having phase continuity based on the phase continuity configuration indicating that phase continuity may be enabled.

Some examples of the method, apparatuses, and non-transitory computer-readable medium described herein may further include operations, features, means, or instructions for transmitting a set of multiple demodulation reference signals associated with the set of multiple physical uplink channels in the second time domain window.

A method for wireless communications at a network entity is described. The method may include transmitting a control message that includes an indication of a transmission time interval structure format indicating a pattern of one or more uplink transmission time intervals, one or more downlink transmission time intervals, or any combination thereof, over a set of multiple transmission time intervals, transmitting control signaling that schedules a first phase-tracking reference signal in a first time domain window for joint channel estimation corresponding to the transmission time interval structure format and that indicates a phase continuity configuration for the first time domain window, and receiving a set of multiple physical uplink channels within the first time domain window in accordance with the phase continuity configuration.

An apparatus for wireless communications at a network entity is described. The apparatus may include a processor, memory coupled with the processor, and instructions stored in the memory. The instructions may be executable by the processor to cause the apparatus to transmit a control message that includes an indication of a transmission time interval structure format indicating a pattern of one or more uplink transmission time intervals, one or more downlink transmission time intervals, or any combination thereof, over a set of multiple transmission time intervals, transmit control signaling that schedules a first phase-tracking reference signal in a first time domain window for joint channel estimation corresponding to the transmission time interval structure format and that indicates a phase continuity configuration for the first time domain window, and receive a set of multiple physical uplink channels within the first time domain window in accordance with the phase continuity configuration.

Another apparatus for wireless communications at a network entity is described. The apparatus may include means for transmitting a control message that includes an indication of a transmission time interval structure format indicating a pattern of one or more uplink transmission time intervals, one or more downlink transmission time intervals, or any combination thereof, over a set of multiple transmission time intervals, means for transmitting control signaling that schedules a first phase-tracking reference signal in a first time domain window for joint channel estimation corresponding to the transmission time interval structure format and that indicates a phase continuity configuration for the first time domain window, and means for receiving a set of multiple physical uplink channels within the first time domain window in accordance with the phase continuity configuration.

A non-transitory computer-readable medium storing code for wireless communications at a network entity is described. The code may include instructions executable by a processor to transmit a control message that includes an indication of a transmission time interval structure format indicating a pattern of one or more uplink transmission time intervals, one or more downlink transmission time intervals, or any combination thereof, over a set of multiple transmission time intervals, transmit control signaling that schedules a first phase-tracking reference signal in a first time domain window for joint channel estimation corresponding to the transmission time interval structure format and that indicates a phase continuity configuration for the first time domain window, and receive a set of multiple physical uplink channels within the first time domain window in accordance with the phase continuity configuration.

In some examples of the method, apparatuses, and non-transitory computer-readable medium described herein, receiving the set of multiple physical uplink channels may include operations, features, means, or instructions for receiving, within the first time domain window, one or more of the set of multiple physical uplink channels without phase continuity based on the phase continuity configuration indicating that phase continuity may be disabled due to the first phase-tracking reference signal being scheduled within the first time domain window.

Some examples of the method, apparatuses, and non-transitory computer-readable medium described herein may further include operations, features, means, or instructions for receiving a set of multiple demodulation reference signals associated with the set of multiple physical uplink channels and the one or more phase-tracking reference signals in the first time domain window.

Some examples of the method, apparatuses, and non-transitory computer-readable medium described herein may further include operations, features, means, or instructions for receiving, within a second time domain window for joint channel estimation corresponding to the transmission time interval structure format, two or more of the set of multiple physical uplink channels having phase continuity based on the phase continuity configuration indicating that phase continuity may be enabled.

Some examples of the method, apparatuses, and non-transitory computer-readable medium described herein may further include operations, features, means, or instructions for receiving, from the UE, a set of multiple demodulation reference signals over a set of multiple different transmission time intervals within the time domain window, determining a joint channel estimate based on the set of multiple demodulation reference signals received, and demodulating the set of multiple physical uplink channels based on the joint channel estimate.

BRIEF DESCRIPTION OF THE DRAWINGS

FIGS. 15 through 18 show flowcharts illustrating methods that support phase tracking reference signals and demodulation reference signals for joint channel estimation in accordance with aspects of the present disclosure.

DETAILED DESCRIPTION

Figure 1:
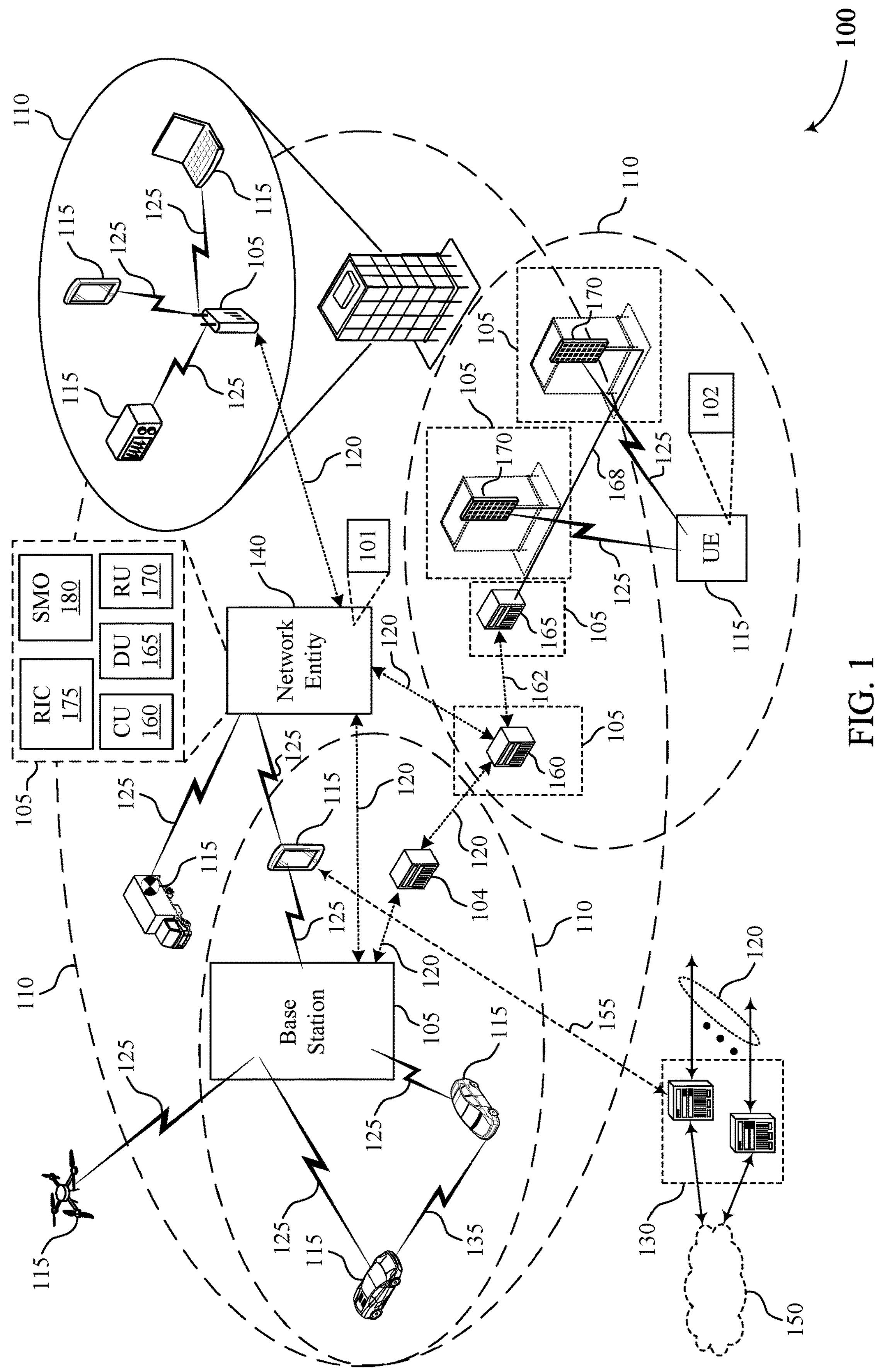
FIG. 1 illustrates an example of a wireless communications system that supports phase tracking reference signals and demodulation reference signals for joint channel estimation in accordance with aspects of the present disclosure.

Some wireless communications systems may transmit multiple uplink transmissions (e.g., repetitions of a single PUSCH or PUCCH message or different data or control messages) while maintaining phase continuity across respective transmissions or repetitions of an uplink message in different transmission time intervals (TTIs). Maintaining the phase continuity may be referred to as bundling and may include using a same set of parameters for a respective set of transmissions or repetitions (e.g., a same frequency resource, same transmit power, same spatial transmit relation, same antenna ports, same precoding, or the like). Bundling one or more respective sets of repetitions may support joint processing of demodulation reference signals (DMRS) at a network entity. In some examples, a user equipment (UE) may determine time domain windows (e.g., bundle intervals) during which the UE may maintain phase continuity for uplink transmissions.

In some examples, a UE may transmit phase-tracking reference signals (PTRS) to permit tracking and identification of phase errors across time (e.g., within a TTI or across multiple TTIs). However, cases where PTRSs are transmitted may correspond to scenarios with high phase error (e.g., cases where maintaining phase continuity is difficult or impossible). Some wireless communications systems may not support techniques for determining whether to perform DMRS bundling (e.g., joint channel estimation) during time domain windows in which PTRSs are scheduled.

Techniques are described for controlling whether a UE is to maintain phase continuity across multiple physical uplink channel transmissions occurring within a time domain window based on whether a PTRS is also scheduled within the time domain window. A network entity may configure the UE with TTI format information (e.g., a frequency division multiplexing (FDM) configuration, a time division multiplexing (TDD) configuration, or the like), and the UE may determine time domain windows for joint channel estimation based thereon. The network entity may also configure the UE with an association between one or more DMRS ports and one or more PTRS ports. In such examples, the UE may maintain phase continuity across the physical uplink channel transmissions within a time domain window in which a PTRS is scheduled when DMRS and PTRS are transmitted via the associated DMRS port and PTRS port (e.g., when the PTRS-DMRS association is identical across the time domain window).

In some cases, the UE may not maintain phase continuity across multiple physical uplink channel transmissions occurring within a time domain window when a PTRS is also scheduled within the time domain window. Whether a PTRS is scheduled in a time domain window may be used to control when the UE is to maintain phase continuity across multiple physical uplink channel transmissions occurring within the time domain window. In such examples, the UE may maintain phase continuity in time domain windows in which no PTRSs are scheduled, and may not maintain phase continuity during time domain windows in which PTRSs are scheduled.

Aspects of the disclosure are initially described in the context of wireless communications systems. Aspects of the disclosure are further illustrated by and described with reference to resource configurations, joint channel estimation schemes, and process flows. Aspects of the disclosure are further illustrated by and described with reference to apparatus diagrams, system diagrams, and flowcharts that relate to phase tracking reference signals and demodulation reference signals for joint channel estimation.

FIG. 1 illustrates an example of a wireless communications system 100 that supports phase tracking reference signals and demodulation reference signals for joint channel estimation in accordance with aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein. In some examples, the wireless communications system 100 may support enhanced broadband communications, ultra-reliable (e.g., mission critical) communications, low latency communications, communications with low-cost and low-complexity devices, or any combination thereof.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130) In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to DUs 165 or RUs 170, and the DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. The DUs 165 or one or more RUs 170 may be partially controlled by CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support phase tracking reference signals and demodulation reference signals for joint channel estimation as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be positioned according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support concurrent communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving geographic coverage area 110. In some examples, different geographic coverage areas 110 associated with different technologies may overlap, but the different coverage areas 110 may be supported by the same network entity 105. In other examples, the overlapping coverage areas 110 associated with different technologies may be supported by different network entities 105. The wireless communications system 100 may include, for example, a heterogeneous network in which different types of the network entities 105 provide coverage for various geographic coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

The UEs 115 and the network entities 105 may support retransmissions of data to increase the likelihood that data is received successfully. Hybrid automatic repeat request (HARQ) feedback is one technique for increasing the likelihood that data is received correctly over a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In some other examples, the device may provide HARQ feedback in a subsequent slot, or according to some other time interval.

Techniques are described for controlling whether a UE 115 is to maintain phase continuity across multiple physical uplink channel transmissions occurring within a time domain window (e.g., a bundling interval) based on whether a PTRS is also scheduled within the time domain window. A time domain window may refer to a time period during which a UE is expected to maintain power consistency and phase continuity among PUCCH or PUSCH transmissions within the time period, subject to power consistency and phase continuity criteria. A network entity may configure the UE 115 with TTI format information (e.g., an FDM configuration, a TDD configuration, or the like), and the UE 115 may determine time domain windows for joint channel estimation based thereon. The network entity may also configure the UE 115 with an association between one or more DMRS ports and one or more PTRS ports. In such examples, the UE 115 may maintain phase continuity across the physical uplink channel transmissions within a time domain window in which a PTRS is scheduled when DMRS and PTRS are transmitted via the associated DMRS and PTRS ports (e.g., when the PTRS-DMRS association is identical across the time domain window).

In some cases, the UE 115 may not maintain phase continuity across multiple physical uplink channel transmissions occurring within a time domain window when a PTRS is also scheduled within the time domain window. Whether a PTRS is scheduled in a time domain window may be used to control when the UE is to maintain phase continuity across multiple physical uplink channel transmissions occurring within the time domain window. In such examples, the UE 115 may maintain phase continuity in time domain windows in which no PTRSs are scheduled, and may not maintain phase continuity during time domain windows in which PTRSs are scheduled.

Figure 2:
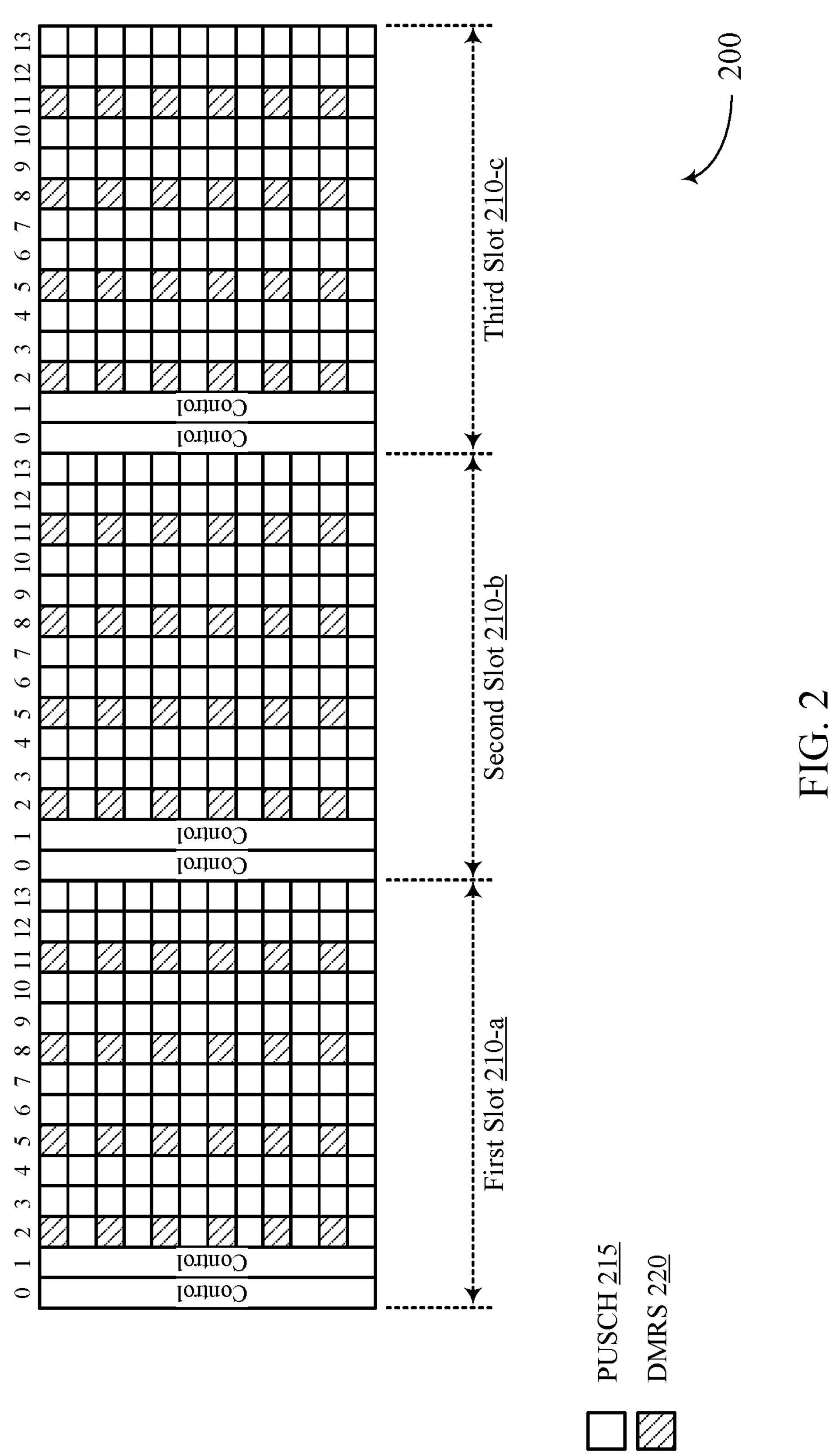
FIG. 2 illustrates an example of a resource configuration that supports phase tracking reference signals and demodulation reference signals for joint channel estimation in accordance with aspects of the present disclosure.

FIG. 2 illustrates an example of a resource configuration 200 in accordance with aspects of the present disclosure. In some examples, resource configuration 200 may implement, or be implemented by, aspects of wireless communications system 100. The resource configuration 200 illustrates a set of resources 205 across multiple slots 210 which may be used for transmission/reception of phase-coherent DMRSs. Although illustrated with reference to a PUSCH 215, the techniques described with reference to FIG. 2 may also be implemented on a PUCCH. Similarly, although illustrated with reference to slots 210, the techniques described with reference to FIG. 2 may also be implemented across various TTIs (e.g., slots, mini-slots, sub-slots, symbols, frames, subframes, or the like).

A UE may transmit uplink data on a PUSCH 215 (or control information on a PUCCH). The UE may also transmit DMRSs 220, which may be mapped to resources within a slot 210. The network entity may receive uplink transmissions (e.g., on PUSCH 215) and DMRSs. The network entity may use the DMRSs to demodulate and decode the uplink transmissions. In some wireless communications systems (e.g., legacy communications systems), a network entity may rely on the DMRSs 220 in a slot 210 to decode the uplink transmissions in that slot 210. That is, a network entity may use the DMRSs 220 located in slot 210-*a* to decode the PUSCH 215 in slot 210-*a*, may use the DMRSs 220 located in slot 210-*b* to decode the PUSCH 215 in slot 210-*b*, and may use the DMRSs 220 located in slot 210-*c* to decode the PUSCH 215 in slot 210-*c*.

In some examples, some wireless communications systems (e.g., wireless communications system 100) may support jointly processing DMRSs 220 in multiple uplink transmissions (e.g., PUSCH transmissions or PUCCH transmissions). That is, a wireless device (e.g., a UE 115) may maintain phase continuity from one slot to another slot. If a UE bundles DMRSs 220 located in different slots, but having phase continuity, then the network entity may use the DMRSs of one slot 210 to decode uplink transmissions received in another bundled slot. Thus, by implementing techniques described herein, UEs 115 may transmit bundled DMRSs 220 having phase continuity (e.g., phase-coherent DMRSs 220) to improve channel estimation by the network entity 105.

In some examples, resource configuration 200 may support uplink repetitions (e.g., PUCCH repetitions or PUSCH repetitions), which may enhance coverage. For example, a UE 115 may transmit one or more repetitions of an uplink channel (e.g., an uplink control message on a PUCCH or an uplink data message on a PUSCH). If each of slot 210-*a*, slot 210-*b*, and slot 210-*c* are allocated for uplink transmissions, UE 115 may transmit a first repetition of an uplink data message on PUSCH 215 in slot 210-*a*, a second repetition of the uplink data message on PUSCH 215 in slot 210-*b*, and a third repetition of the uplink data message on PUSCH 215 in slot 210-*c*.

In some wireless communications systems (e.g., wireless communications system 100), DMRSs 220 may be bundled across multiple slots, such that phase continuity may be maintained across multiple slots 210 and/or across the multiple transmissions. For example, in the wireless communications system 100, a UE 115 may be configured to transmit a DMRSs 220 within the first slot 210-*a*, the second slot 210-*b*, and the third slot 210-*c*, where phase continuity is maintained across each of the slots 210-*a*, 210-*b*, and 210-*c*. In this example, a network entity 105 may be configured to jointly process (e.g., aggregate) the phase-coherent DMRSs 220 received across the slots 210-*a*, 210-*b*, and 210-*c* when performing channel estimation (e.g., cross-slot channel estimation), and may use a determined joint channel estimate to demodulate the PUSCH 215 transmissions received across the slots 210-*a*, 210-*b*, and 210-*c*.

In some examples, a UE 115 may be able to maintain phase continuity across first slot 210-*a*, second slot 210-*b*, and third slot 210-*c*. To maintain phase continuity, a UE 115 may satisfy one or more phase continuity rules. For instance, parameters that may be used for DMRSs 220 associated with one or more PUSCH 215 transmissions may include, but are not limited to, phase, frequency allocations, transmission powers, transmission relations, antenna ports used for transmission schemes, precoding schemes, or any combination thereof. For example, as illustrated in FIG. 2, in cases where DMRSs 220 are bundled across the first slot 210-*a*, the second slot 210-*b*, and the third slot 210-*c*, the frequency allocation and transmit power for the DMRSs 220 within each respective slot 210 may remain the same. Conversely, phase-continuity may not be maintained across slots 210 (e.g., phase discontinuity) in cases where DMRSs 220 in respective slots 210 exhibit one or more different parameters (e.g., different phases, different frequency resource allocations within or between PUSCH slots, non-contiguous time resource allocation of PUSCH slots, different transmit powers, different antenna ports, different transmission powers, or the like).

In cases where the UE 115 can maintain phase continuity across slot 210-*a*, slot 210-*b*, and slot 210-*c*, the UE 115 may perform DMRS enhancement procedures. For example, as described in greater detail with reference to FIG. 3, the UE may bundle one or more distinct uplink transmissions, or repetitions of uplink transmissions (e.g., PUCCH or PUSCH repetitions within a slot or across one or more slots) within time domain windows. For instance, within a time domain window, instead of transmitting a same number of DMRSs in each slot 210, UE 115 may transmit some repetitions of uplink channels in a slot 210 with a first DMRS density (e.g., a first number of DMRSs and mapping of the DMRSs), and may transmit one or more additional repetitions of the uplink channel using a second DMRS density that has less DMRSs or no DMRSs. For instance, UE 115 may transmit the first repetition of the uplink channel in slot 210-*a* using the first DMRS density, may transmit the second repetition of the uplink channel in slot 210-*b* using the second DMRS density (e.g., a reduced number of DMRSs or no DMRSs), and the third repetition of the uplink channel in slot 210-*c* using the first DMRS density. By mapping DMRSs to the slot using such DMRS enhancement schemes, UE 115 may more efficiently use available resources without decreasing the likelihood that network entity 105 cannot successfully decode the uplink channel. For example, network entity 105 may receive one or more of the repetitions, and may use the DMRSs included in first slot 210-*a* and third slot 210-*c* to decode the uplink transmission received during second slot 210-*b*.

In some examples, as described in greater detail with reference to FIG. 3, the UE may determine (e.g., based on configuration information such as slot formatting information) one or more time domain windows (e.g., bundle intervals) in which the UE can maintain phase continuity for one or more uplink transmissions or uplink repetitions. As described in greater detail with reference to FIG. 4, the network entity may schedule PTRSs in one or more of the determined time domain windows. In some examples, as described in greater detail with reference to FIG. 5, the UE may maintain phase continuity across multiple uplink transmissions or uplink repetitions during one or more TTIs of the time domain window by using an identical association between DMRS and PTRS ports for the duration of the time domain window. In some examples, as described in greater detail with reference to FIG. 6, the UE may determine whether to maintain phase continuity across multiple uplink transmissions or uplink repetitions during a given time domain window based on whether PTRSs are scheduled in the time domain window.

Figure 3:
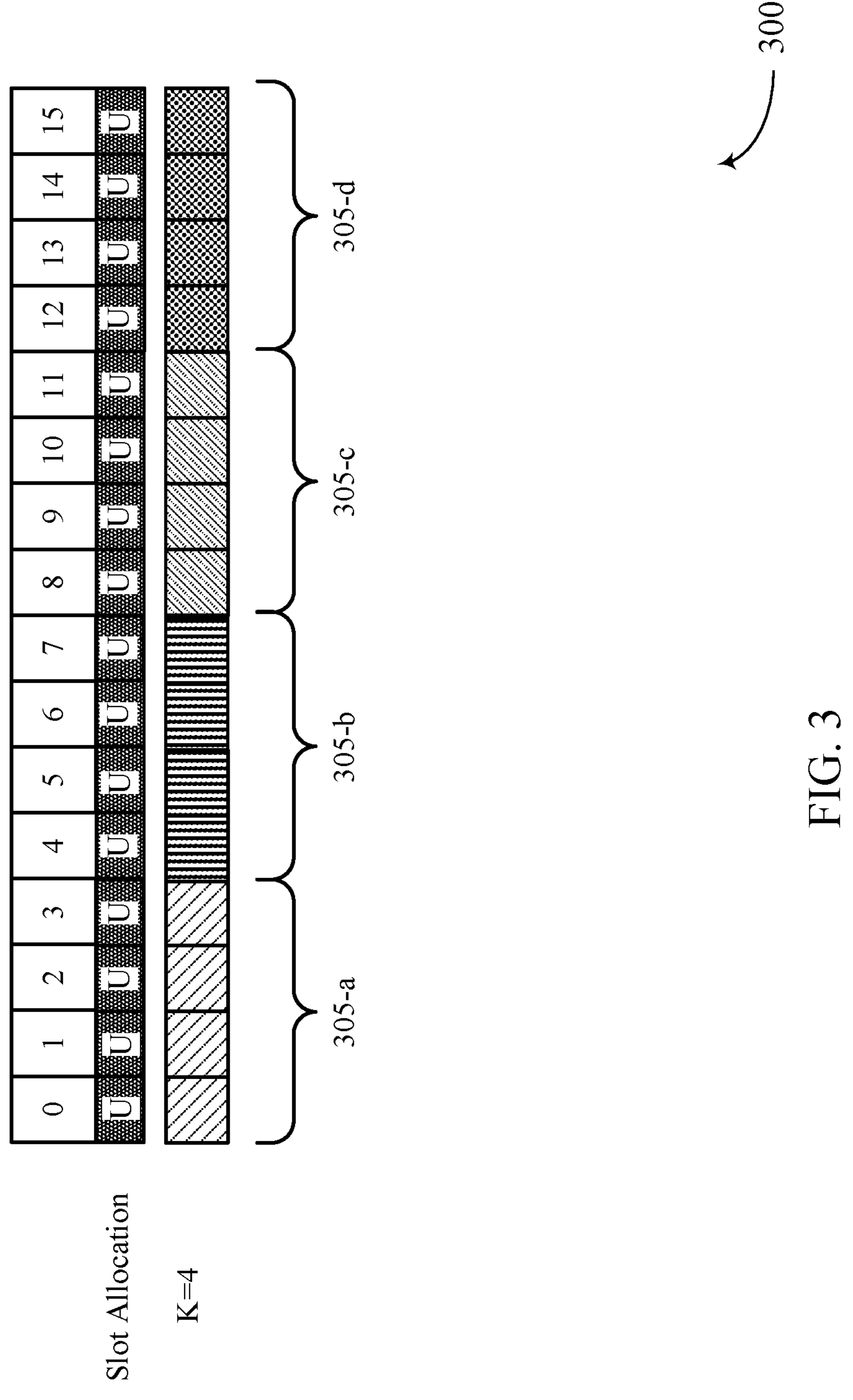
FIG. 3 illustrates an example of a joint channel estimation scheme that supports phase tracking reference signals and demodulation reference signals for joint channel estimation in accordance with aspects of the present disclosure.

FIG. 3 illustrates an example of a joint channel estimation scheme 300 that supports phase tracking reference signals and demodulation reference signals for joint channel estimation in accordance with aspects of the present disclosure. joint channel estimation scheme 300 may implement, or may be implemented by, a UE and a network entity, which may be examples of corresponding devices described with reference to FIGS. 1 and 2.

In some examples, a network entity may configure the UE with information (e.g., TTI formatting information), one or more time domain window rules, time domain window durations, or any combination thereof. The UE may determine one or more time domain windows 305 (e.g., based at least in part on the configuration information). Each time domain window may span a number of TTIs (K). A time domain window may be defined such that a UE may coherently transmit one or more uplink repetitions or one or more distinct uplink transmissions (e.g., scheduled by separate DCI messages) within the time domain window subject to one or more phase continuity conditions or rules. That is, if the one or more phase continuity conditions are satisfied within a time domain window, the UE may transmit uplink signaling on physical uplink channels (e.g., PUCCH transmissions or PUSCH transmissions) while maintaining phase continuity within a bundle. The network entity may configure time domain windows at a UE via higher layer signaling (e.g., radio resource control (RRC) signaling), dynamic signaling (e.g., downlink control information (DCI) signaling), or the UE may implicitly determine the time domain windows based on uplink repetition transmission configurations, TTI formatting information, or the like. Each time domain window may be the same size (e.g., have the same value for K).

The network entity may also configure the UE with resource allocation information. For example, the UE may be configured with a FDM configuration, as illustrated with reference to FIG. 3. In such examples, each TTI (e.g., slot) in a set of frequency resources (e.g., a PUSCH or PUCCH) may be allocated for uplink signaling (e.g., U). The UE may transmit scheduled uplink signaling during each U TTI. For instance, the network entity may configure the UE to transmit 16 repetitions of an uplink message (e.g., an initial transmission of the uplink message followed by 15 repetitions of the uplink message) during slots 0-15.

In some examples, the network entity may configure the UE with a time domain window of K=4. The time domain window may indicate four consecutive TTIs (e.g., slots), and each time domain window may also be consecutive (e.g., a second time domain window begins at the first TTI after a previous bundle ends). For instance, a first time domain window 305-*a* may begin in slot 0, and may span slots 0-3. A second time domain window 305-*b* may begin in the next slot (e.g., slot 4), and may span slots 4-7. A third time domain window 305-*c* may begin in the next slot (e.g., slot 8), and may span slots 8-11, while a fourth time domain window 305-*d* may span slots 12-15. Within each time domain window 305, the UE may be able to maintain phase continuity according to the one or more phase continuity rules.

In some examples (e.g., not illustrated), the UE may be configured with a time-division multiplexing (TDM) configuration, where each TTI is allocated as an uplink TTI (e.g., U), a downlink TTI (e.g., D), or a special (e.g., flexible) TTI (e.g., S). Some or all symbols in an S TTI may be allocated for uplink signaling, and some or all symbols in the S TTI may be allocated for downlink signaling. In some examples, a TDM resource allocation may include a pattern of U, D, and S TTIs. An illustrative example pattern may be: DDDSUDDSUU. Such a pattern may repeat itself over time (e.g., across various TTIs).

A UE may perform uplink repetitions (e.g., PUCCH repetitions or PUSCH repetitions) in available U TTIs (or available U TTIs and S TTIs). In such examples, each time domain window may indicate a number (e.g., 4 if K=4) of consecutive TTIs (e.g., slots). Each time domain window may also be consecutive (e.g., a second bundle begins at the first TTI after a previous bundle ends). For instance, a first time domain window may begin in slot 4, and may span slots 4 through 7. A second time domain window may begin in the next slot (e.g., slot 8), and may span slots 8-11, etc. In some examples, a next time domain window may begin at a next available TTI (e.g., a next U TTI or a next S TTI). For example, a first time domain window may begin in slot 4, and may span slots 4 through 7. The next available U slot may be slot 8, so the next time domain window may start at slot 8 and span slots 8-11. The next available U slot may be slot 14. So, the next time domain window may start at slot 14 (e.g., instead of slot 12), and may span slots 14-17. In some examples, time domain windows may include only coherent TTIs (e.g., TTIs in which the UE is capable of maintaining phase continuity). For example, the UE may transmit the initial uplink message during slot 4, which may not be coherent with other coherent TTIs. Because slot 4 is not coherent with any other slots, the initial uplink transmission may not be included in a bundle or a time domain window.

As described with reference to FIG. 2, the UE may maintain phase continuity across multiple uplink transmissions or multiple uplink repetitions during a time domain window, which may result in efficient joint channel estimation by the receiving network entity. In some examples, as described with reference to FIG. 4, the network entity may also schedule PTRSs for transmission during a time domain window. In such examples, the UE may determine whether or how to maintain phase continuity during a time domain window, as described in greater detail with reference to FIGS. 5-6.

Figure 4:
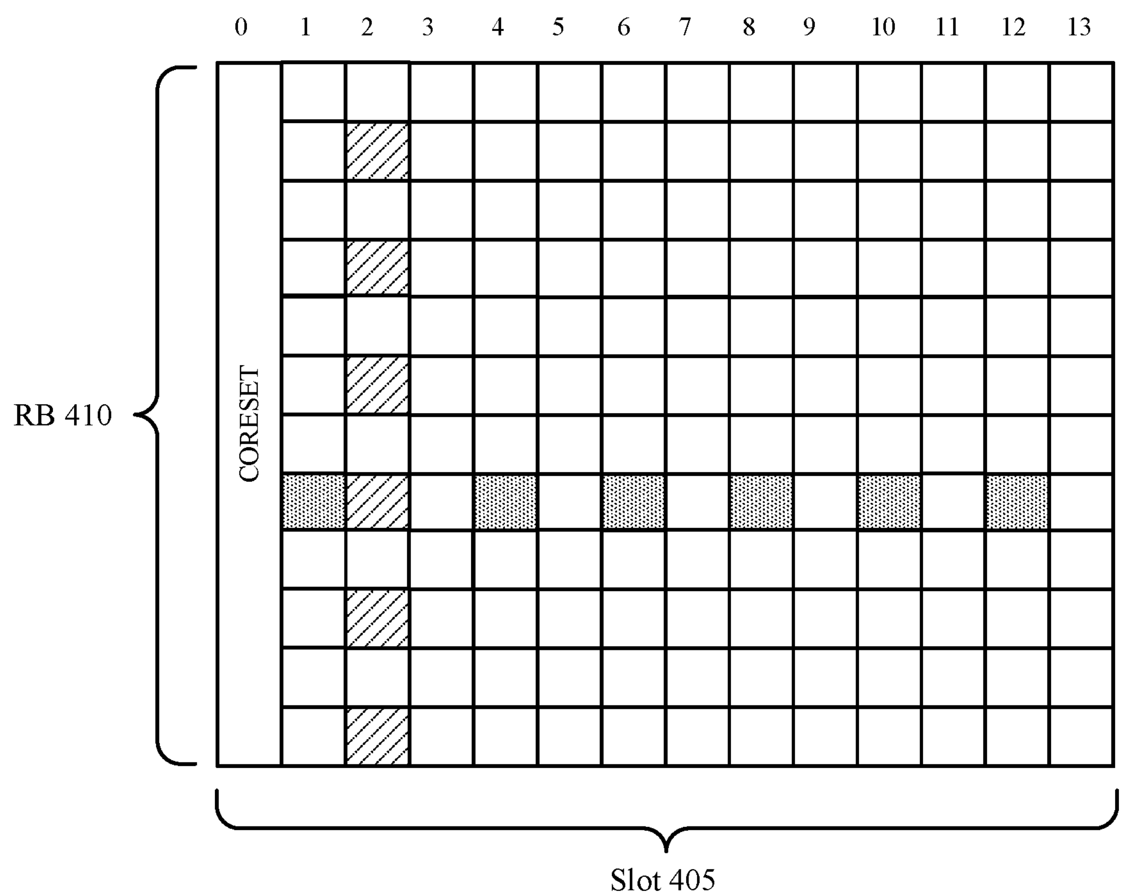
FIG. 4 illustrates an example of a resource configuration that supports phase tracking reference signals and demodulation reference signals for joint channel estimation in accordance with aspects of the present disclosure.

FIG. 4 illustrates an example of a resource configuration 400 that supports phase tracking reference signals and demodulation reference signals for joint channel estimation in accordance with aspects of the present disclosure. Resource configuration 400 may implement or be implemented by a network entity and a UE, which may be examples of corresponding devices described with reference to FIGS. 1-3. Although illustrated with reference to In some examples, a network entity may schedule a UE to transmit DMRSs 420, PTRSs 425, or both, during a TTI (e.g., a slot 405) for transmitting PUSCH 215 (e.g., or a PUCCH). PUSCH 415 resources, DMRS 420 resources, PTRS 425 resources, or any combination thereof, may be allocated across time and frequency resources (e.g., within RB 410), as illustrated with reference to FIG. 4.

PTRSs 425 may be used to enhance successful reception and demodulation of uplink transmissions (PUSCH 415) by a receiving wireless device, such as a network entity 105. In some examples, PTRSs 425 may be considered an extension of DMRSs 420. PTRSs 425 may be used for tracking phase variations across a transmission duration. Phase variations may result from phase noise in oscillators of transmitting devices (e.g., the UE). The purpose of PTRSs 425 may be to track and compensate for phase noise. In some examples, PTRSs 425 may be dense in time, but sparse in frequency. For instance, PTRSs 425 may be located in a single RE of an RB 410, and interspersed across multiple symbols (e.g., symbols 1, 4, 6, 8, 10, and 12) of slot 405. In some examples, PTRSs 425 may be allocated across multiple TTIs (e.g., multiple slots 405). In some examples, a phase jump may occur between two consecutive symbols. In such examples, the UE may use the PTRSs 425 to identify the phase jumps or phase noise, and to compensate for the phase jumps. Thus, the UE may compensate for the phase jumps or phase noise using the PTRSs 425, may perform channel estimation using the DMRSs 420, and may then demodulate the PUSCH 415 based thereon. In some examples, the UE may transmit the DMRSs 420 with different densities across different TTIs (e.g., DMRS bundling), as described in greater detail with reference to FIG. 2. In some examples, the UE may transmit PTRSs 425 across multiple TTIs (e.g., within a time domain window).

In some examples, PTRSs 425 may occur in combination with DMRSs 420 (e.g., may be located in the same slot 405). For instance, the scheduling of PTRSs 425 and DMRSs 420 may be supported in cases where the network entity configures PTRSs 425 to be present in a same slot 405 as DMRSs 420. In cases of cyclic prefix OFDM (CP-OFDM) configurations, a first reference symbol may be at the first symbol of a PUSCH or PDSCH time domain allocation, and may be repeated every N symbols. In cases where the network entity schedules multiple repetitions of a physical uplink channel (e.g., multiple repetitions of an uplink message on a PUCCH or a PUSCH), the UE may reset a repetition counter at each DMRS occasion (e.g., because there may be no need to transmit a PTRS immediately after a DMRS).

A density of PTRSs 425 in the time domain may be linked to a scheduled modulation and coding scheme (MCS). In such examples, the network entity may schedule an uplink transmission or multiple repetitions of an uplink transmission (e.g., on PUSCH 415 or on a PUCCH). The network entity may indicate, to the UE (e.g., in a DCI message), an MCS for the uplink transmission. The UE may determine a density in the time domain for scheduled PTRSs 425 based on the indicated MCS. The time density of the PTRSs 425 may be a function of the scheduled MCS. For instance, the UE may be configured with one or more threshold MCS values (e.g., MCS1, MCS2, MCS3, MCS4, etc.). The UE may determine how a scheduled MCS (e.g., $l_{mcs}$) value compares to the one or more threshold values, as illustrated with reference to Table 1, and may then identify a corresponding time density L (e.g., where L indicates a number of symbols per PTRS 425).

TABLE 1

| Scheduled MCS | Time Density ($L_{PTRS}$) |
|---|---|
| $l_{MCS}$ < MCS1 | PTRS is not present |
| MCS1 ≤ $l_{MCS}$ < MCS2 | 4 |
| MCS2 ≤ $l_{MCS}$ < MCS3 | 2 |
| MCS3 ≤ $l_{MCS}$ < MCS4 | 1 |

Thus, if the scheduled MCS $l_{mcs}$ is less than the first threshold MCS values MCS1, then no PTRS may be present in a scheduled slot 405. However, if the scheduled MCS $l_{mcs}$ is higher than the first threshold MCS value MCS1 but lower than the second threshold MCS value MCS2, then the time density for the scheduled PTRSs 425 may be one PTRS 425 in every 4 symbols. Higher MCS values may correspond to lower time densities, as indicated in Table 1.

A frequency domain density of PTRSs 425 may depend on a scheduled PUSCH bandwidth (e.g., a BWP). In such examples, the network entity may schedule an uplink transmission or multiple repetitions of an uplink transmission (e.g., on PUSCH 415 or on a PUCCH). The network entity may indicate, to the UE (e.g., in a DCI message), frequency resources (e.g., a bandwidth spanning one or more RBs) for the uplink transmission. The UE may determine a density in the frequency domain for scheduled PTRSs 425 based on the indicated bandwidth. The frequency density of the PTRSs 425 may be a function of the scheduled RB. For instance, the UE may be configured with one or more threshold bandwidths spanning different numbers of RBs (e.g., $N_{RBx}$). The UE may determine how a scheduled RB (e.g., $N_{RB}$) compares to the one or more threshold bandwidths, as illustrated with reference to Table 2, and may then identify a corresponding frequency density K (e.g., where K indicates a number REs per PTRS).

TABLE 2

| Scheduled MCS | Frequency Density ($K_{PTRS}$) |
|---|---|
| $N_{RB}$ < $N_{RB0}$ | PTRS is not present |
| $N_{RB0}$ ≤ $N_{RB}$ < $N_{RB1}$ | 2 |
| $N_{RB1}$ ≤ $N_{RB}$ | 4 |

Thus, if the scheduled bandwidth (e.g., $N_{RB}$) is less than the first threshold bandwidth $N_{RB0}$, then the UE may determine that PTRSs 425 are not present for the scheduled uplink transmissions. However, if the scheduled bandwidth (e.g., $N_{RB}$) is greater than the first threshold bandwidth $N_{RB0}$ and the second threshold bandwidth $N_{RB1}$, then the UE may determine a frequency density of one PTRS every 2 REs within an RB. Similarly, a higher bandwidth may result in a higher frequency density.

In some examples, the UE may transmit uplink signaling (e.g., on a PUSCH or PUCCH) with a discrete Fourier transform spread OFDM (DFT-s-OFDM) transmission scheme. In such examples, the UE may insert the samples representing PTRSs 425 prior to DFT precoding.

The UE may transmit uplink signaling (e.g., including DMRSs 420 and PTRSs 425) using one or more antenna ports. Antenna ports may be defined such that any channel (e.g., physical uplink channel) over which the antenna port transmits uplink signaling during a symbol may be inferred from the channel over which the antenna port transmits uplink signaling during another symbol. Each antenna port may correspond to a resource grid. Antenna ports used for transmission of a physical uplink channel or signal may depend on the number of antenna ports configured for that physical uplink channel or signal. Different reference signals may mapped to different antenna ports. For example, DMRSs 420 may be mapped to different DMRS ports, PTRSs 425 may be mapped to different PTRS ports, etc. The UE may transmit reference signals via corresponding ports by performing precoding and resource mapping to generate a resource grid for physical uplink channels that the UE transmits wirelessly using the appropriate antenna port.

In some examples, the network entity may configure the UE with a PTRS-DMRS port association. The PTRS-DMRS association may indicate an association between one or more DMRS ports and one or more PTRS ports. One or more spatial transmission parameters (e.g., an uplink transmission filter, Doppler, delay, or the like) for the associated PTRS ports may be the same or substantially similar as one or more spatial transmission parameters for the associated DMRS ports. Thus, phase noise that occurs when transmitting the PTRSs 425 using an associated PTRS port may be the same as phase noise occurring when transmitting the DMRSs 420 using an associated DMRS port. For instance, a DMRS port and a PTRS port may be associated according to the PTRS-DMRS port association. In such examples, a phase jump associated with the PTRSs 425 may be detected by the network entity based on the PTRSs 425 that were transmitted using the PTRS port. The receiving network entity may compensate for the detected phase jumps, and may apply the compensations to DMRSs 420 received via the associated DMRS port when determining a channel estimate or a joint channel estimate over a time period (e.g., one or more slots, a time domain window). The network entity may use the joint channel estimate to receive corresponding uplink transmissions. For example, one or more PTRSs 425 and one or more DMRSs 420 may be transmitted in multiple slots within a time domain window where the UE maintains phase continuity for a set of uplink channels transmitted within the time domain window. The network entity may use a joint channel estimate generated using the PTRSs 425 and one or more DMRSs 420 for receiving and demodulating the set of uplink channels transmitted within the time domain window. Thus, the association between the DMRS ports and the PTRS ports may be used to successfully compensate for phase noise and to demodulate uplink signaling.

Conversely, compensation for a phase jump associated with a PTRS port may not be applicable to a DMRS that was transmitted via a non-associated DMRS port.

The network entity may indicate a PTRS-DMRS port association in a DCI message (e.g., DCI format 0_0 or DCI format 0_1). The PTRS-DMRS port association may indicate an association for a single uplink PTRS port (e.g., PTRS port 0). For example, a value in a PTRS-DMRS port association field may correspond to a single DMRS port, as indicated in Table 3:

TABLE 3

| Value | DMRS port |
|---|---|
| 0 | First scheduled DMRS port |
| 1 | Second scheduled DMRS port |
| 2 | Third scheduled DMRS port2 |
| 3 | Fourth scheduled DMRS port |

If the PTRS-DMRS port association value included in the DCI is a 0, then the UE may determine that a first scheduled DMRS port is associated with the PTRS port 0. If the PTRS-DMRS port association value included in the DCI is a 1, then the UE may determine that a second scheduled DMRS port is associated with the PTRS port 0, etc.

In some examples, the PTRS-DMRS port association may indicate an association for multiple uplink PTRS port (e.g., PTRS port 0 and PTRS port 1). For example, field in a DCI (e.g., a PTRS-DMRS port association field) may include at least two bits (e.g., a most significant bit (MSB) and a least significant bit (LSB). Various combinations of the MSB and the LSB may indicate pairs of DMRS ports that are associated with pairs of DMRS ports. For instance, the MSB may indicate a DMRS port associated with a first PTRS port 0, and the LSB may indicate a DMRS port associated with a second PTRS port 1, as indicated in Table 4:

TABLE 4

| Value of MSB | DMRS port | Value of LSB | DMRS port |
|---|---|---|---|
| 0 | First DMRS port which shares PTRS port 0 | 0 | First MRS port which shares PTRS port 1 |
| 1 | Second DMRS port which shares PTRS port 0 | 1 | Second DMRS port which shares PTRS port 1 |

The network entity may configure a PTRS-DMRS port association for a single TTI or multiple TTIs. In some examples, the PTRS-DMRS port association may be different across multiple consecutive TTIs. In some examples, the PTRS-DMRS port association may be the same across multiple consecutive TTIs (e.g., within a time domain window).

Thus, as described with reference to FIG. 4, the UE may be scheduled to transmit both DMRSs 420 and PTRSs 425 within the same slot 405 (e.g., or within one or more slots 405 within a time domain window). In some examples, a network entity may schedule the UE to transmit PTRSs 425 across multiple slots 405. For instance, the UE may be scheduled to transmit DMRSs 420, PTRSs 425, or both, during a set of slots 405 (e.g., slot 210-*a*, slot 210-*b*, and slot 210-*c* illustrated with reference to FIG. 2). In some examples, the network entity may configure the UE to transmit PTRSs 425 across multiple TTIs within a time domain window, such as the time domain windows described with reference to FIG. 3.

A UE may be able to maintain phase continuity within a time domain window. However, PTRSs 425 may be scheduled to measure and compensate for phase jumps and phase noise, which may make maintaining phase continuity (e.g., within the time domain window) difficult or impossible for the UE. That is, cases where PTRSs 425 are scheduled may correspond to scenarios with high phase error (e.g., cases where maintaining phase continuity is difficult or impossible), even if the PTRSs 425 are scheduled within a time domain window. Some wireless communication systems may not support techniques for determining whether to perform DMRS bundling (joint channel estimation) during bundle intervals (time domain windows) in which PTRSs 425 are scheduled.

Techniques are described for controlling whether a UE is to maintain phase continuity across multiple physical uplink channel transmissions occurring within a time domain window based on whether a PTRS 425 is also scheduled within the time domain window. For example, presence or absence of PTRS 425 may be used to turn on or off phase continuity criteria for a UE in a respective time domain window.

In some examples, as described in greater detail with reference to FIG. 5, joint channel estimation (e.g., DMRS bundling) may be permitted for a physical uplink channel (e.g., a PUCCH or a PUSCH) in a time domain window, even when PTRS is configured in the same time domain window. In such examples, a PTRS-DMRS association may be identical across the physical uplink channel transmissions within the time domain window. For example, as illustrated with reference to FIG. 3, the UE may determine a time domain window 305-*a*, a second time domain window 305-*b*, etc. The network entity may schedule PTRSs in at least one TTI (e.g., slot 1) of time domain window 305-*a*. In such examples, the UE may maintain phase continuity across each slot of time domain window 305-*a* if the PTRS-DMRS association is the same across physical uplink channels in the time domain window 305-*a* (e.g., across slots 0-3). For instance, the network entity may configure the UE with a PTRS-DMRS port association for the full duration of time domain window 305-*a*. The UE may transmit DMRSs, PTRSs, or both, during the time domain window (e.g., including slot 0) according to the PTRS-DMRS port association. The UE may also maintain phase continuity for the multiple physical uplink channel transmissions during time domain window 305-*a*. However, if a PTRS-DMRS port association is not the same for each TTI of a time domain window 305, the UE may not maintain phase continuity during the time domain window 305. For instance, if PTRSs are scheduled during time domain window 305-*b*, but a PTRS-DMRS port association is different for slot 4 and slot 7, for example, then the UE may no maintain phase continuity across time domain window 305-*b*.

Maintaining the same association between a DMRS port and a PTRS port across a time window may permit a receiver (e.g., the network entity) to use the PTRS to compensate for phase noise in the DMRS to generate an improved joint channel estimation that may be used to enhance demodulation of the corresponding uplink channel repetitions transmitted within the time domain window. In some examples, one or more rules restricting joint channel estimation in time domain windows with scheduled PTRSs 425 may be included in a one or more standards documents. In some examples, the one or more rules may be indicated to the UE by the network entity, or otherwise preconfigured at the UE. For example, having the same association between a DMRS port and a PTRS port across a time window may permit a receiver (e.g., the network entity) to use the PTRS to compensate for phase noise in the DMRS to generate an improved joint channel estimation that may be used to enhance demodulation of the corresponding uplink channel repetitions transmitted within the time domain window.

In some examples, as described in greater detail with reference to FIG. 6, the UE may not maintain phase continuity across multiple physical uplink channel transmissions occurring within a time domain window when a PTRS is also scheduled within the time domain window. Whether a PTRS is scheduled in a time domain window may be used to control when the UE is to maintain phase continuity across multiple physical uplink channel transmissions occurring within the time domain window. In such examples, the UE may maintain phase continuity in time domain windows in which no PTRSs are scheduled, and may not maintain phase continuity during time domain windows in which PTRSs are scheduled. For example, as illustrated with reference to FIG. 3, the UE may determine one or more time domain windows 305, including a first time domain window 305-*a* and a second time domain window 305-*b*. The network entity may schedule PTRSs in a TTI (e.g., slot 1) of time domain window 305-*a*, but may not schedule PTRSs during any TTIs of time domain window 305-*b*. In such examples, because PTRSs are scheduled in time domain window 305-*a*, the UE may not maintain phase continuity during time domain window 305-*a*, and may not perform DMRS bundling. Because no PTRSs are scheduled in time domain window 305-*b*, the UE may maintain phase continuity during time domain window 305-*b*, and may perform DMRS bundling.

Figure 5:
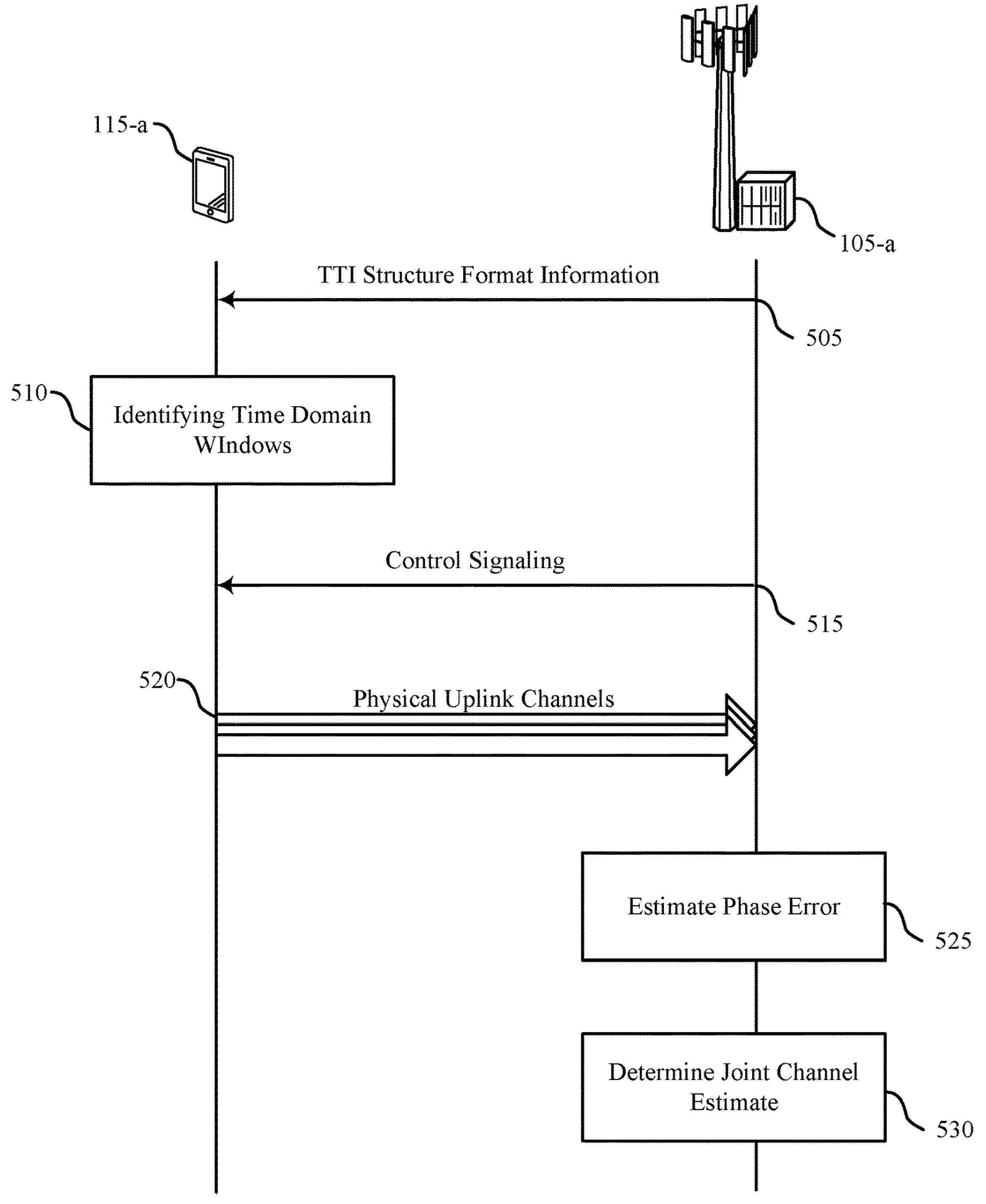
FIG. 5 illustrates an example of a process flow that supports phase tracking reference signals and demodulation reference signals for joint channel estimation in accordance with aspects of the present disclosure.

FIG. 5 illustrates an example of a process flow 500 that supports phase tracking reference signals and demodulation reference signals for joint channel estimation in accordance with aspects of the present disclosure. Process flow 500 may be implemented by or may implement aspects of wireless devices such as a UE 115-*a* and a network entity 105-*a*, which may be examples of corresponding devices described with reference to FIGS. 1-4.

At 505, network entity 105-*a* may transmit, and UE 115-*a* may receive, TTI structure format information. For example, UE 115-*a* may receive a control message that includes an indication of the TTI structure format information. The TTI structure format information may indicate a pattern of one or more uplink TTIs. For example, the TTI structure format information may allocate one or more TTIs as U TTIs, D TTIs, S TTIs, or the like (e.g., in a TDM configuration).

At 510, UE 115-*a* may identify one or more time domain windows. UE 115-*a* may identify the time domain windows based on the T TI structure format. For instance, the TTI structure format information (e.g., or any additional control signaling) may indicate a K value (e.g., a number of TTIs) for time domain windows, one or more rules for maintaining phase continuity, or the like. UE 115-*a* may determine the time domain windows for joint channel estimation based on such information.

At 515, network entity 105-*a* may transmit, and UE 115-*a* may receive, control signaling that schedules a first PTRS in a time domain window (e.g., determined at 510) for joint channel estimation corresponding to the TTI structure format. The control signaling (e.g., a same control message or a different control message) may indicate an association between a PTRS port and a DMRS port (e.g., or between multiple PTRS ports and multiple DMRS ports) for the time domain window. The association may be a PTRS-DMRS port association as described with reference to FIG. 4. In some examples, the PTRS-DMRS port association may be indicated in the control signaling for the entirety of the time domain window (e.g., such that UE 115-*a* may maintain an identical PTRS-DMRS port association for the entirety of the time domain window). In some examples, the control message may be a DCI message including an indication of the association between the PTRS port and the DMRS port (e.g., or the multiple PTRS ports and multiple DMRS ports).

At 520, UE 115-*a* may transmit, and network entity 105-*a* may receive, multiple physical uplink channels (e.g., multiple uplink messages on a physical uplink channel such as a PUSCH or a PUCCH) during the time domain window. The multiple physical uplink channels may have phase continuity, and may use the association between the PTRS port and the DMRS port, across the multiple physical uplink channels within the time domain window. For example, the UE 115-*a* may transmit each of one or more DMRS transmissions within the time domain window using the indicated DMRS port, each of one or more PTRS transmissions within the time domain window using the indicated DMRS port, and may transmit the multiple physical uplink channels during the time domain window.

The multiple physical uplink channels may be multiple repetitions of a single uplink message on the PUCCH or PUSCH. In some examples, the multiple physical uplink channels may be distinct transmissions (e.g., scheduled by distinct DCI messages and may transport distinct packets or transport blocks).

UE 115-*a* may also transmit, and network entity 105-*a* may receive, multiple DMRSs across the TTIs of the time domain window via the DMRS port according to the PTRS-DMRS port association. UE 115-*a* may transmit, and network entity 105-*b* may receive, multiple PTRSs across the TTIs of the time domain window via the PTRS port according to the PTRS-DMRS port association.

In some examples, UE 115-*a* may receive control signaling (e.g., at 515) indicating a bandwidth (e.g., a set of RBs, a bandwidth part (BWP), or the like) associated with the physical uplink channels (e.g., scheduling frequency resources for the physical uplink channels). UE 115-*a* may transmit the PTRSs in accordance with a frequency density associated with the bandwidth.

In some examples, UE 115-*a* may receive control signaling (e.g., at 515) indicating an MCS (e.g., for the physical uplink channels). UE 115-*a* may transmit the PTRSs in accordance with a time density associated with the MCS.

In some examples, the control signaling (e.g., received at 515) may schedule the PTRSs in the time domain window. The control signaling may include an indication of one or more DMRS occasions in the time domain window. In such examples, UE 115-*a* may transmit physical uplink channels and PTRSs in accordance with a PTRS repetition counter that is reset at each occasion of the DMRS occasions.

At 525, network entity 105-*a* may estimate a phase error based on receiving the PTRSs. At 530, network entity 105-*b* may determine a joint channel estimate for the time domain window based on having received the DMRSs. Network entity 105-*a* may compensate for the phase error estimated at 525, and may receive the DMRSs based thereon. Network entity 105-*a* may apply the phase error based on the PTRS- DMRS port association. Having receive the DMRSs, network entity 105-*a* may demodulate the physical uplink channels received at 520.

Figure 6:
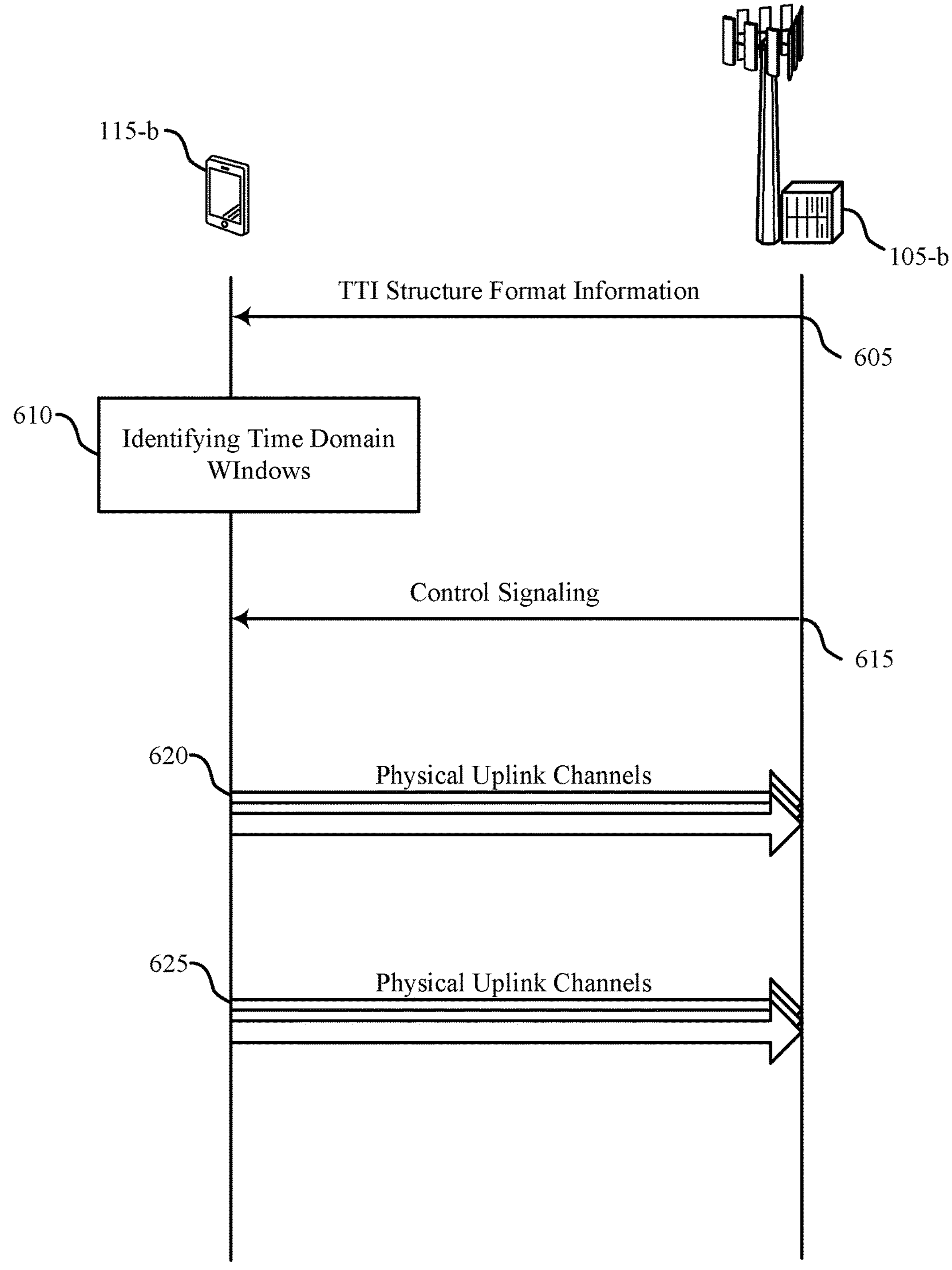
FIG. 6 illustrates an example of a process flow that supports phase tracking reference signals and demodulation reference signals for joint channel estimation in accordance with aspects of the present disclosure.

FIG. 6 illustrates an example of a process flow 600 that supports phase tracking reference signals and demodulation reference signals for joint channel estimation in accordance with aspects of the present disclosure. Process flow 600 may be implemented by or may implement aspects of wireless devices such as a UE 115-*b* and a network entity 105-*b*, which may be examples of corresponding devices described with reference to FIGS. 1-5.

At 605, network entity 105-*b* may transmit, and UE 115-*b* may receive, TTI structure format information. For example, UE 115-*b* may receive a control message that includes an indication of the TTI structure format information. The TTI structure format information may indicate a pattern of one or more uplink TTIs. For example, the TTI structure format information may allocate one or more TTIs as U TTIs, D TTIs, S TTIs, or the like (e.g., in a TDM configuration).

At 610, UE 115-*b* may identify one or more time domain windows. UE 115-*b* may identify the time domain windows based on the TTI structure format. For instance, the TTI structure format information (e.g., or any additional control signaling) may indicate a K value (e.g., a number of TTIs) for time domain windows, one or more rules for maintaining phase continuity, or the like. UE 115-*b* may determine the time domain windows for joint channel estimation based on such information.

At 615, network entity 105-*a* may transmit, and UE 115-*a* may receive, control signaling that schedules a first PTRS in a first time domain window (e.g., determined at 610) for joint channel estimation corresponding to the TTI structure format. The control signaling (e.g., a same control message or a different control message) may indicate a phase continuity configuration for the first time domain window. The phase continuity configuration for the first time domain window may indicate some time domain windows in which UE 115-*b* is to maintain phase continuity, and some time domain windows in which UE 115-*b* is not to maintain phase continuity. In some examples, the control signaling may include one or more rules, indicating that UE 115-*b* is to maintain phase continuity in time domain windows in which no PTRSs are scheduled, and is not to maintain phase continuity in time domain windows in which PTRSs are scheduled. In such examples, one or more such rules indicating whether UE 115-*b* is to maintain phase continuity during various time domain windows based on whether PTRSs are scheduled in the time domain windows. In some examples, the control message may be a DCI message.

At 620, UE 115-*b* may transmit, and network entity 105-*b* may receive, multiple physical uplink channels (e.g., multiple uplink messages on a physical uplink channel such as a PUSCH or a PUCCH) during the first time domain window in accordance with the phase continuity configuration. The multiple physical uplink channels may not have phase continuity. UE 115-*b* may transmit the multiple physical uplink channels without phase continuity based at least in part on the phase continuity configuration indicating that phase continuity is disabled due to the first phase-tracking reference signal being scheduled within the first time domain window.

At 620, UE 115-*b* may also transmit multiple DMRSs associated with the multiple physical uplink channels and the one or more PTRSs scheduled in the first time domain window.

AT 625, UE 115-*b* may transmit additional physical uplink channels in a second time domain window. In some examples, network entity 105-*b* may not have scheduled any PTRSs in the second time domain window. UE 115-*b* may transmit the additional physical uplink channels having phase continuity based on the phase continuity configuration indicating that phase continuity is enabled for the second time domain window. UE 115-*b* may also transmit DMRSs associated with the physical uplink channels in the second time domain window.

Figure 7:
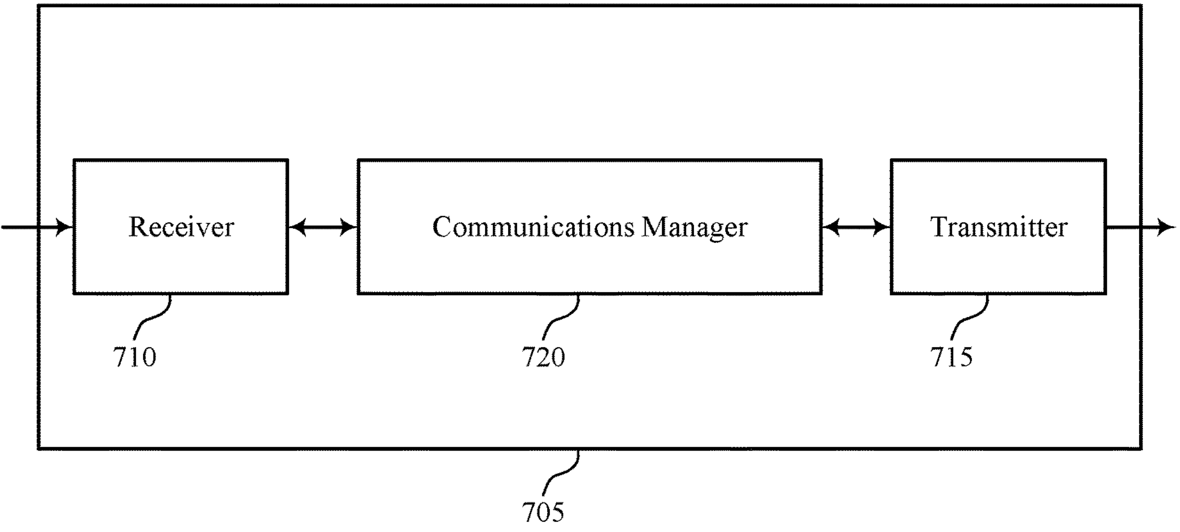
FIGS. 7 and 8 show block diagrams of devices that support phase tracking reference signals and demodulation reference signals for joint channel estimation in accordance with aspects of the present disclosure.

FIG. 7 shows a block diagram 700 of a device 705 that supports phase tracking reference signals and demodulation reference signals for joint channel estimation in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to phase tracking reference signals and demodulation reference signals for joint channel estimation). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to phase tracking reference signals and demodulation reference signals for joint channel estimation). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of phase tracking reference signals and demodulation reference signals for joint channel estimation as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720 the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a user equipment in accordance with examples as disclosed herein. For example, the communications manager 720 may be configured as or otherwise support a means for receiving a control message that includes an indication of a transmission time interval structure format indicating a pattern of one or more uplink transmission time intervals, one or more downlink transmission time intervals, or any combination thereof, over a set of multiple transmission time intervals. The communications manager 720 may be configured as or otherwise support a means for receiving control signaling that schedules a first phase-tracking reference signal in a time domain window for joint channel estimation corresponding to the transmission time interval structure format and indicates an association between a phase-tracking reference signal port and a demodulation reference signal port for the time domain window. The communications manager 720 may be configured as or otherwise support a means for transmitting, within the time domain window, a set of multiple physical uplink channels having phase continuity using the association between the phase-tracking reference signal port and the demodulation reference signal port across the set of multiple physical uplink channels within the time domain window.

Additionally, or alternatively, the communications manager 720 may support wireless communications at a UE in accordance with examples as disclosed herein. For example, the communications manager 720 may be configured as or otherwise support a means for receiving a control message that includes an indication of a transmission time interval structure format indicating a pattern of one or more uplink transmission time intervals, one or more downlink transmission time intervals, or any combination thereof, over a set of multiple transmission time intervals. The communications manager 720 may be configured as or otherwise support a means for receiving control signaling that schedules a first phase-tracking reference signal in a first time domain window for joint channel estimation corresponding to the transmission time interval structure format and that indicates a phase continuity configuration for the first time domain window. The communications manager 720 may be configured as or otherwise support a means for transmitting a set of multiple physical uplink channels within the first time domain window in accordance with the phase continuity configuration.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for joint channel estimation resulting in efficient determination of when to maintain phase continuity in a time domain window in which PTRSs are also scheduled. This may in turn result in improved system efficiency, improved reliability of uplink signaling, decreased system latency, and improved user experience.

Figure 8:
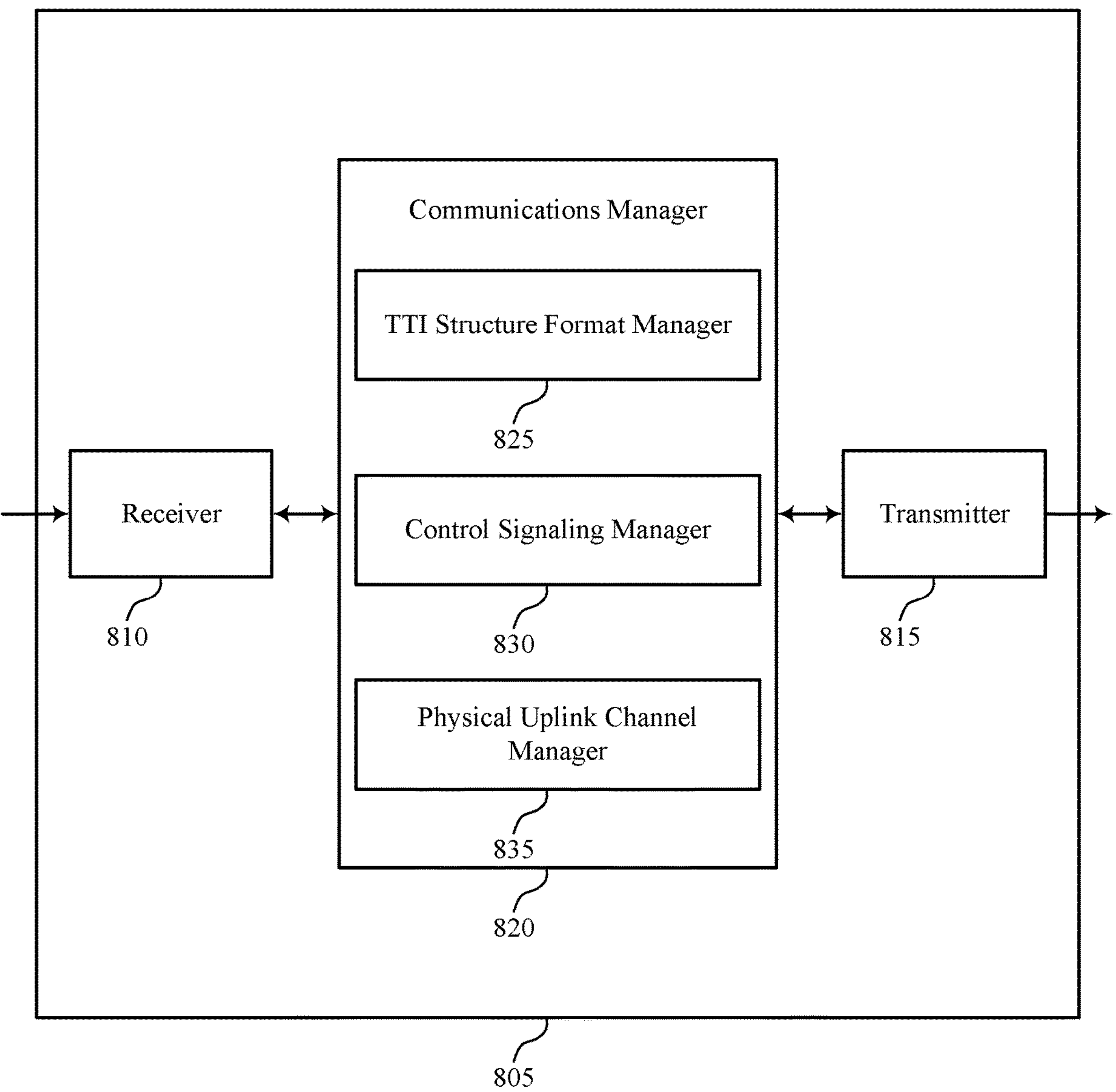

FIG. 8 shows a block diagram 800 of a device 805 that supports phase tracking reference signals and demodulation reference signals for joint channel estimation in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to phase tracking reference signals and demodulation reference signals for joint channel estimation). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to phase tracking reference signals and demodulation reference signals for joint channel estimation). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of phase tracking reference signals and demodulation reference signals for joint channel estimation as described herein. For example, the communications manager 820 may include a TTI structure format manager 825, a control signaling manager 830, a physical uplink channel manager 835, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a user equipment in accordance with examples as disclosed herein. The TTI structure format manager 825 may be configured as or otherwise support a means for receiving a control message that includes an indication of a transmission time interval structure format indicating a pattern of one or more uplink transmission time intervals, one or more downlink transmission time intervals, or any combination thereof, over a set of multiple transmission time intervals. The control signaling manager 830 may be configured as or otherwise support a means for receiving control signaling that schedules a first phase-tracking reference signal in a time domain window for joint channel estimation corresponding to the transmission time interval structure format and indicates an association between a phase-tracking reference signal port and a demodulation reference signal port for the time domain window. The physical uplink channel manager 835 may be configured as or otherwise support a means for transmitting, within the time domain window, a set of multiple physical uplink channels having phase continuity using the association between the phase-tracking reference signal port and the demodulation reference signal port across the set of multiple physical uplink channels within the time domain window.

Additionally, or alternatively, the communications manager 820 may support wireless communications at a UE in accordance with examples as disclosed herein. The TTI structure format manager 825 may be configured as or otherwise support a means for receiving a control message that includes an indication of a transmission time interval structure format indicating a pattern of one or more uplink transmission time intervals, one or more downlink transmission time intervals, or any combination thereof, over a set of multiple transmission time intervals. The control signaling manager 830 may be configured as or otherwise support a means for receiving control signaling that schedules a first phase-tracking reference signal in a first time domain window for joint channel estimation corresponding to the transmission time interval structure format and that indicates a phase continuity configuration for the first time domain window. The physical uplink channel manager 835 may be configured as or otherwise support a means for transmitting a set of multiple physical uplink channels within the first time domain window in accordance with the phase continuity configuration.

Figure 9:
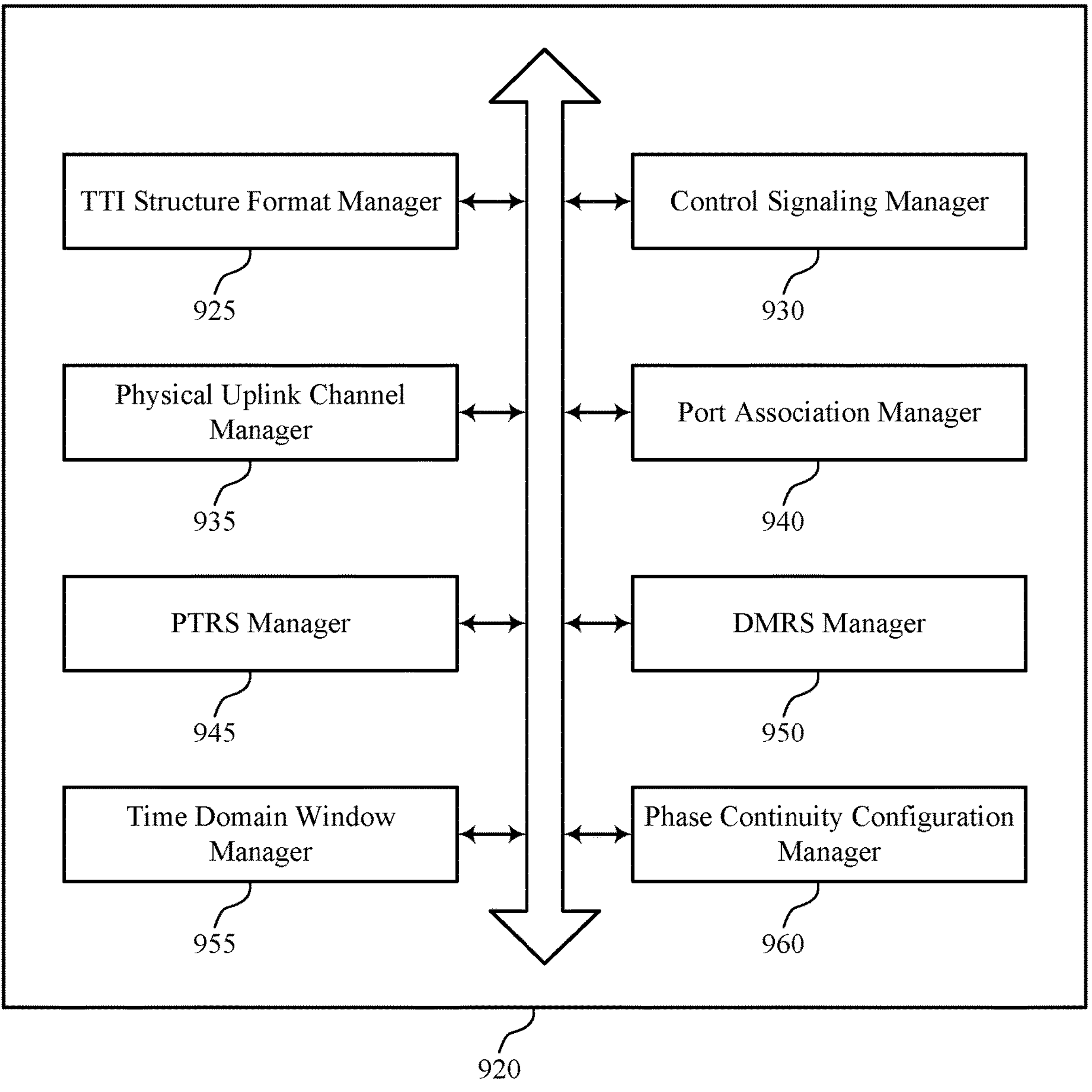
FIG. 9 shows a block diagram of a communications manager that supports phase tracking reference signals and demodulation reference signals for joint channel estimation in accordance with aspects of the present disclosure.

FIG. 9 shows a block diagram 900 of a communications manager 920 that supports phase tracking reference signals and demodulation reference signals for joint channel estimation in accordance with aspects of the present disclosure. The communications manager 920 may be an example of aspects of a communications manager 720, a communications manager 820, or both, as described herein. The communications manager 920, or various components thereof, may be an example of means for performing various aspects of phase tracking reference signals and demodulation reference signals for joint channel estimation as described herein. For example, the communications manager 920 may include a TTI structure format manager 925, a control signaling manager 930, a physical uplink channel manager 935, a port association manager 940, an PTRS manager 945, a DMRS manager 950, a time domain window manager 955, a phase continuity configuration manager 960, or any combination thereof. Each of these components may communicate, directly or indirectly, with one another (e.g., via one or more buses).

The communications manager 920 may support wireless communications at a user equipment in accordance with examples as disclosed herein. The TTI structure format manager 925 may be configured as or otherwise support a means for receiving a control message that includes an indication of a transmission time interval structure format indicating a pattern of one or more uplink transmission time intervals, one or more downlink transmission time intervals, or any combination thereof, over a set of multiple transmission time intervals. The control signaling manager 930 may be configured as or otherwise support a means for receiving control signaling that schedules a first phase-tracking reference signal in a time domain window for joint channel estimation corresponding to the transmission time interval structure format and indicates an association between a phase-tracking reference signal port and a demodulation reference signal port for the time domain window. The physical uplink channel manager 935 may be configured as or otherwise support a means for transmitting, within the time domain window, a set of multiple physical uplink channels having phase continuity using the association between the phase-tracking reference signal port and the demodulation reference signal port across the set of multiple physical uplink channels within the time domain window.

In some examples, to support receiving the control signaling, the port association manager 940 may be configured as or otherwise support a means for receiving a downlink control information message including an indication of the association between the phase-tracking reference signal port and the demodulation reference signal port for the time domain window.

In some examples, to support transmitting, the port association manager 940 may be configured as or otherwise support a means for transmitting, using the association, a set of multiple demodulation reference signals via a demodulation reference signal port and a set of multiple phase-tracking reference signals via the phase-tracking reference signal port across the set of multiple physical uplink channels having phase continuity within the time domain window.

In some examples, the PTRS manager 945 may be configured as or otherwise support a means for receiving the control signaling including an indication of a bandwidth part associated with the set of multiple physical uplink channels. In some examples, the PTRS manager 945 may be configured as or otherwise support a means for transmitting, within the time domain window, a set of multiple phase-tracking reference signals including the first phase-tracking reference signal in accordance with a frequency domain density corresponding to the bandwidth part.

In some examples, the PTRS manager 945 may be configured as or otherwise support a means for receiving the control signaling including an indication of a modulation and coding scheme associated with the set of multiple physical uplink channels. In some examples, the PTRS manager 945 may be configured as or otherwise support a means for transmitting a set of multiple phase-tracking reference signals including the first phase-tracking reference signal in accordance with a time domain density corresponding to the modulation and coding scheme.

In some examples, to support receiving the control signaling that schedules the first phase-tracking reference signal in the time domain window, the DMRS manager 950 may be configured as or otherwise support a means for receiving an indication of one or more demodulation reference signal occasions in the time domain window. In some examples, to support receiving the control signaling that schedules the first phase-tracking reference signal in the time domain window, the PTRS manager 945 may be configured as or otherwise support a means for transmitting, within the time domain window, a set of multiple phase-tracking reference signals including the first phase-tracking reference signal in accordance with a phase-tracking reference signal repetition counter that is reset at each occasion of the one or more demodulation reference signal occasions.

In some examples, to support transmitting the set of multiple physical uplink channels, the physical uplink channel manager 935 may be configured as or otherwise support a means for transmitting the set of multiple physical uplink channels as a set of multiple repetitions of a same physical uplink channel.

In some examples, to support transmitting the set of multiple physical uplink channels, the physical uplink channel manager 935 may be configured as or otherwise support a means for transmitting the set of multiple physical uplink channels including a first physical uplink channel scheduled by a first downlink control information message and a second physical uplink channel scheduled by a second downlink control information message, where the first physical uplink channel is different than the second physical uplink channel.

In some examples, to support set of multiple physical uplink channels, the physical uplink channel manager 935 may be configured as or otherwise support a means for one or more physical uplink shared channels, one or more physical uplink control channels, or a combination thereof.

In some examples, the time domain window manager 955 may be configured as or otherwise support a means for identifying a set of multiple time domain windows for joint channel estimation based on the transmission time interval structure format.

Additionally, or alternatively, the communications manager 920 may support wireless communications at a UE in accordance with examples as disclosed herein. In some examples, the TTI structure format manager 925 may be configured as or otherwise support a means for receiving a control message that includes an indication of a transmission time interval structure format indicating a pattern of one or more uplink transmission time intervals, one or more downlink transmission time intervals, or any combination thereof, over a set of multiple transmission time intervals. In some examples, the control signaling manager 930 may be configured as or otherwise support a means for receiving control signaling that schedules a first phase-tracking reference signal in a first time domain window for joint channel estimation corresponding to the transmission time interval structure format and that indicates a phase continuity configuration for the first time domain window. In some examples, the physical uplink channel manager 935 may be configured as or otherwise support a means for transmitting a set of multiple physical uplink channels within the first time domain window in accordance with the phase continuity configuration.

In some examples, to support transmitting the set of multiple physical uplink channels, the phase continuity configuration manager 960 may be configured as or otherwise support a means for transmitting, within the first time domain window, one or more of the set of multiple physical uplink channels without phase continuity based on the phase continuity configuration indicating that phase continuity is disabled due to the first phase-tracking reference signal being scheduled within the first time domain window.

In some examples, the DMRS manager 950 may be configured as or otherwise support a means for transmitting a set of multiple demodulation reference signals associated with the set of multiple physical uplink channels and the first phase-tracking reference signal in the first time domain window.

In some examples, the physical uplink channel manager 935 may be configured as or otherwise support a means for transmitting, within a second time domain window for joint channel estimation corresponding to the transmission time interval structure format, two or more of the set of multiple physical uplink channels having phase continuity based on the phase continuity configuration indicating that phase continuity is enabled.

In some examples, the DMRS manager 950 may be configured as or otherwise support a means for transmitting a set of multiple demodulation reference signals associated with the set of multiple physical uplink channels in the second time domain window.

Figure 10:
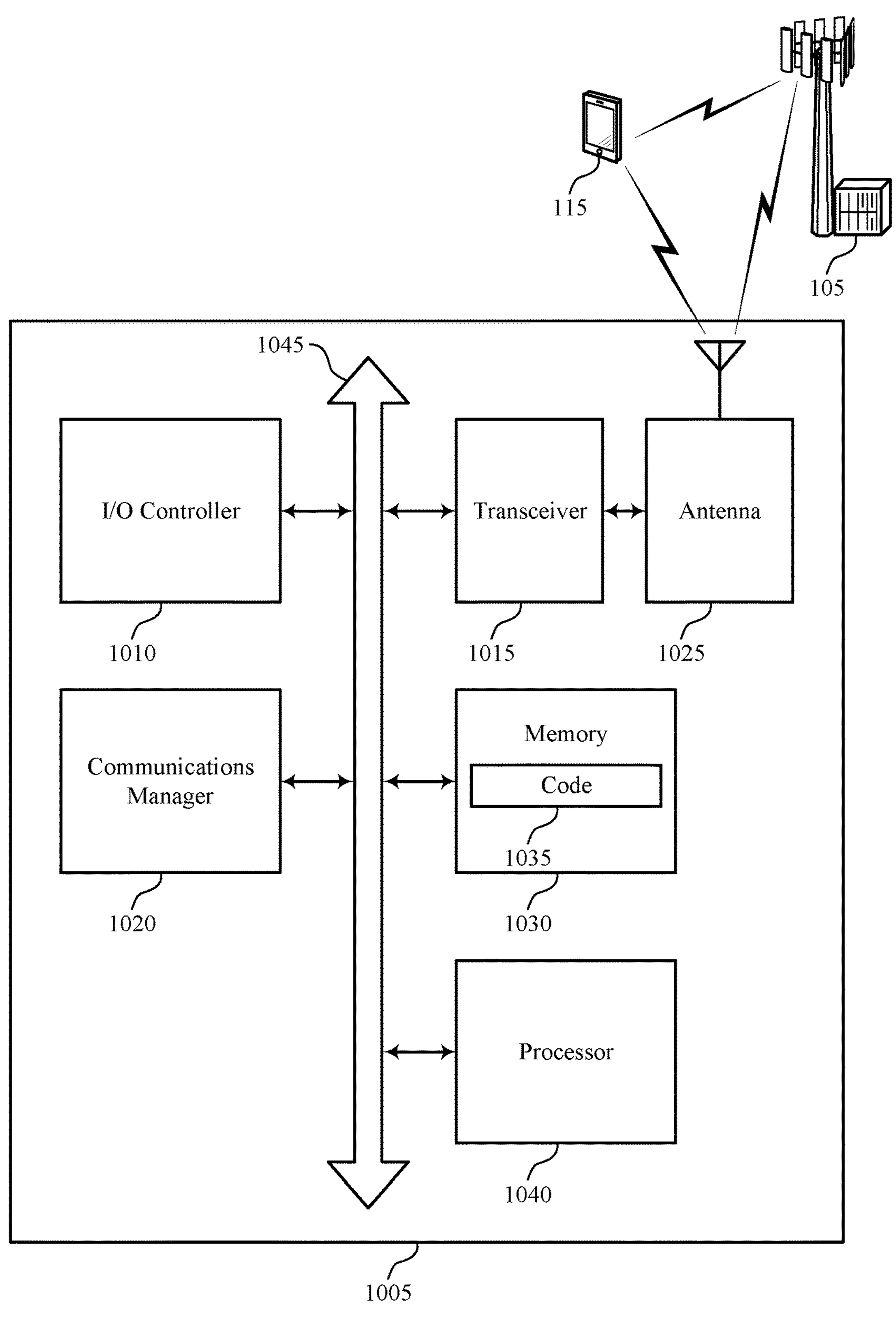
FIG. 10 shows a diagram of a system including a device that supports phase tracking reference signals and demodulation reference signals for joint channel estimation in accordance with aspects of the present disclosure.

FIG. 10 shows a diagram of a system 1000 including a device 1005 that supports phase tracking reference signals and demodulation reference signals for joint channel estimation in accordance with aspects of the present disclosure. The device 1005 may be an example of or include the components of a device 705, a device 805, or a UE 115 as described herein. The device 1005 may communicate wirelessly with one or more network entities 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally, or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting phase tracking reference signals and demodulation reference signals for joint channel estimation). For example, the device 1005 or a component of the device 1005 may include a processor 1040 and memory 1030 coupled to the processor 1040, the processor 1040 and memory 1030 configured to perform various functions described herein.

The communications manager 1020 may support wireless communications at a user equipment in accordance with examples as disclosed herein. For example, the communications manager 1020 may be configured as or otherwise support a means for receiving a control message that includes an indication of a transmission time interval structure format indicating a pattern of one or more uplink transmission time intervals, one or more downlink transmission time intervals, or any combination thereof, over a set of multiple transmission time intervals. The communications manager 1020 may be configured as or otherwise support a means for receiving control signaling that schedules a first phase-tracking reference signal in a time domain window for joint channel estimation corresponding to the transmission time interval structure format and indicates an association between a phase-tracking reference signal port and a demodulation reference signal port for the time domain window. The communications manager 1020 may be configured as or otherwise support a means for transmitting, within the time domain window, a set of multiple physical uplink channels having phase continuity using the association between the phase-tracking reference signal port and the demodulation reference signal port across the set of multiple physical uplink channels within the time domain window.

Additionally, or alternatively, the communications manager 1020 may support wireless communications at a UE in accordance with examples as disclosed herein. For example, the communications manager 1020 may be configured as or otherwise support a means for receiving a control message that includes an indication of a transmission time interval structure format indicating a pattern of one or more uplink transmission time intervals, one or more downlink transmission time intervals, or any combination thereof, over a set of multiple transmission time intervals. The communications manager 1020 may be configured as or otherwise support a means for receiving control signaling that schedules a first phase-tracking reference signal in a first time domain window for joint channel estimation corresponding to the transmission time interval structure format and that indicates a phase continuity configuration for the first time domain window. The communications manager 1020 may be configured as or otherwise support a means for transmitting a set of multiple physical uplink channels within the first time domain window in accordance with the phase continuity configuration.

By including or configuring the communications manager 1020 in accordance with examples as described herein, the device 1005 may support techniques for joint channel estimation resulting in efficient determination of when to maintain phase continuity in a time domain window in which PTRSs are also scheduled. This may in turn result in improved system efficiency, improved reliability of uplink signaling, decreased system latency, and improved user experience.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of phase tracking reference signals and demodulation reference signals for joint channel estimation as described herein, or the processor 1040 and the memory 1030 may be otherwise configured to perform or support such operations.

Figure 11:
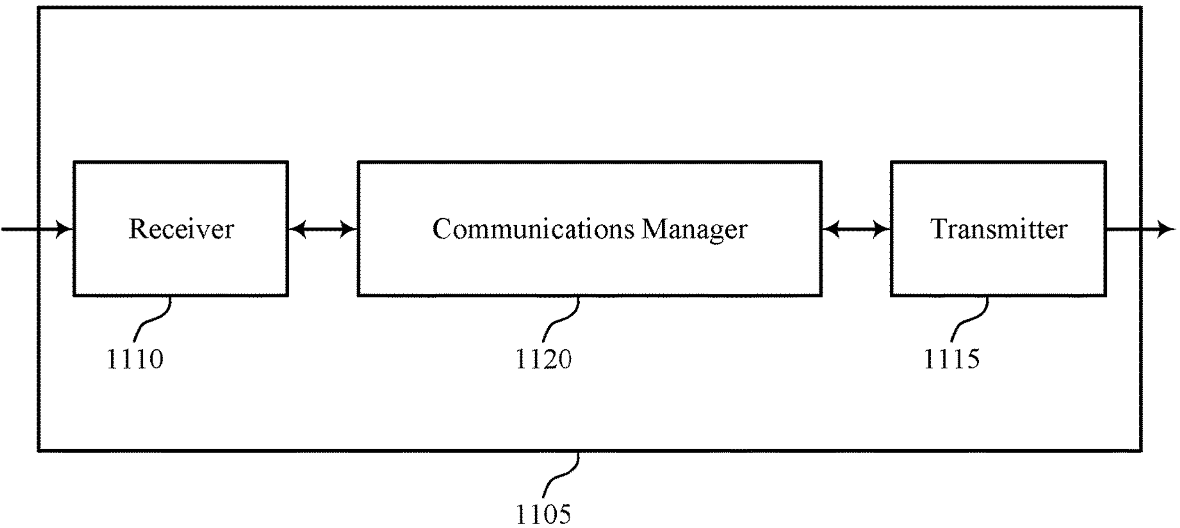
FIGS. 11 and 12 show block diagrams of devices that support phase tracking reference signals and demodulation reference signals for joint channel estimation in accordance with aspects of the present disclosure.

FIG. 11 shows a block diagram 1100 of a device 1105 that supports phase tracking reference signals and demodulation reference signals for joint channel estimation in accordance with aspects of the present disclosure. The device 1105 may be an example of aspects of a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to phase tracking reference signals and demodulation reference signals for joint channel estimation). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to phase tracking reference signals and demodulation reference signals for joint channel estimation). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of phase tracking reference signals and demodulation reference signals for joint channel estimation as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at a network entity in accordance with examples as disclosed herein. For example, the communications manager 1120 may be configured as or otherwise support a means for transmitting, to a UE, a control message that includes an indication of a transmission time interval structure format indicating a pattern of one or more uplink transmission time intervals, one or more downlink transmission time intervals, or any combination thereof, over a set of multiple transmission time intervals. The communications manager 1120 may be configured as or otherwise support a means for transmitting, to the UE, control signaling that schedules a first phase-tracking reference signal in a time domain window for joint channel estimation corresponding to the transmission time interval structure format and indicates an association between a phase-tracking reference signal port and a demodulation reference signal port for the time domain window. The communications manager 1120 may be configured as or otherwise support a means for receiving, from the UE within the time domain window, a set of multiple physical uplink channels having phase continuity using the association between the phase-tracking reference signal port and the demodulation reference signal port across the set of multiple physical uplink channels within the time domain window.

Additionally, or alternatively, the communications manager 1120 may support wireless communications at a network entity in accordance with examples as disclosed herein. For example, the communications manager 1120 may be configured as or otherwise support a means for transmitting a control message that includes an indication of a transmission time interval structure format indicating a pattern of one or more uplink transmission time intervals, one or more downlink transmission time intervals, or any combination thereof, over a set of multiple transmission time intervals. The communications manager 1120 may be configured as or otherwise support a means for transmitting control signaling that schedules a first phase-tracking reference signal in a first time domain window for joint channel estimation corresponding to the transmission time interval structure format and that indicates a phase continuity configuration for the first time domain window. The communications manager 1120 may be configured as or otherwise support a means for receiving a set of multiple physical uplink channels within the first time domain window in accordance with the phase continuity configuration.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for joint channel estimation resulting in efficient determination of when to maintain phase continuity in a time domain window in which PTRSs are also scheduled. This may in turn result in improved system efficiency, improved reliability of uplink signaling, decreased system latency, and improved user experience.

Figure 12:
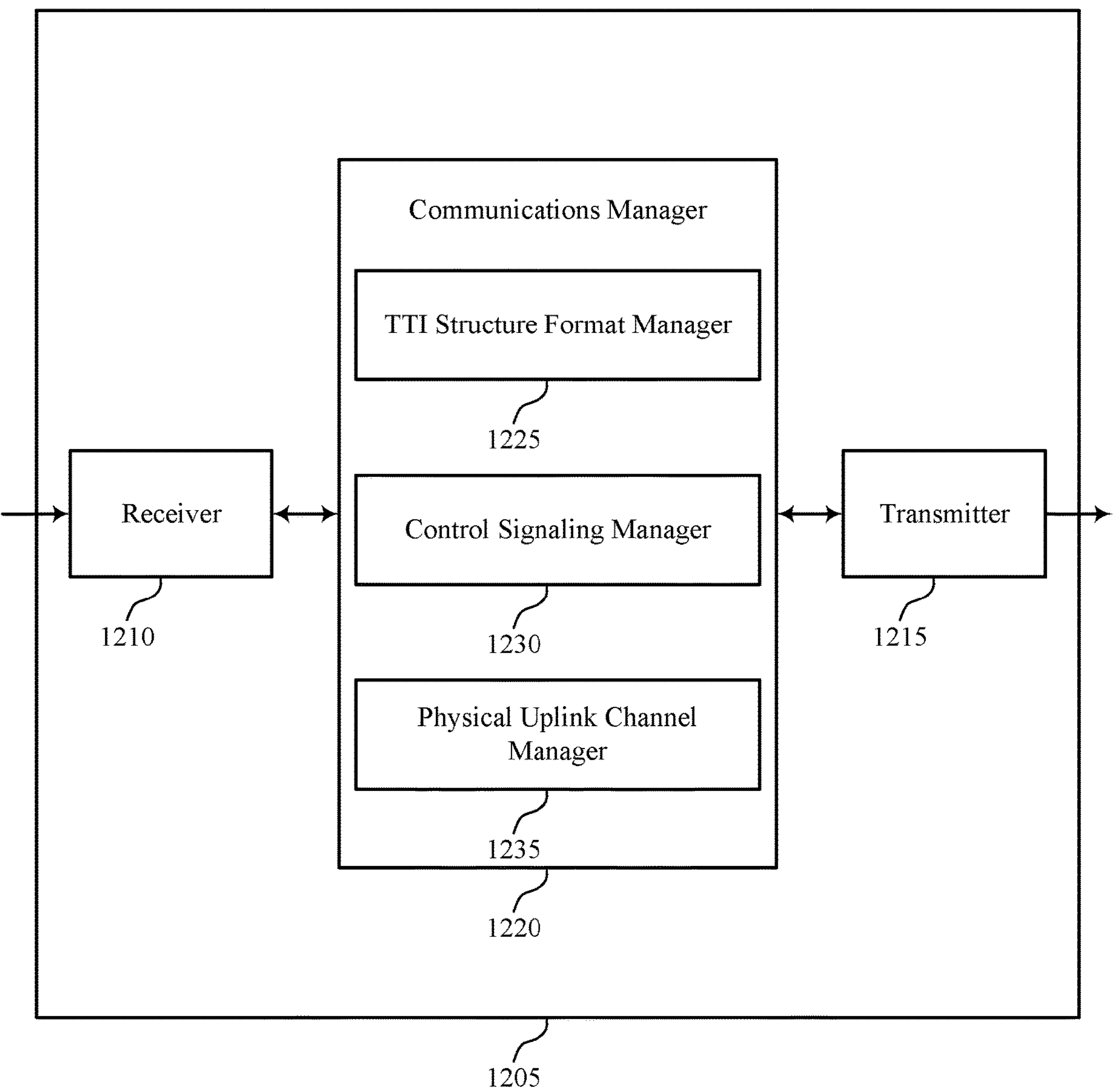

FIG. 12 shows a block diagram 1200 of a device 1205 that supports phase tracking reference signals and demodulation reference signals for joint channel estimation in accordance with aspects of the present disclosure. The device 1205 may be an example of aspects of a device 1105 or a network entity 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to phase tracking reference signals and demodulation reference signals for joint channel estimation). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to phase tracking reference signals and demodulation reference signals for joint channel estimation). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of phase tracking reference signals and demodulation reference signals for joint channel estimation as described herein. For example, the communications manager 1220 may include a TTI structure format manager 1225, a control signaling manager 1230, a physical uplink channel manager 1235, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communications at a network entity in accordance with examples as disclosed herein. The TTI structure format manager 1225 may be configured as or otherwise support a means for transmitting, to a UE, a control message that includes an indication of a transmission time interval structure format indicating a pattern of one or more uplink transmission time intervals, one or more downlink transmission time intervals, or any combination thereof, over a set of multiple transmission time intervals. The control signaling manager 1230 may be configured as or otherwise support a means for transmitting, to the UE, control signaling that schedules a first phase-tracking reference signal in a time domain window for joint channel estimation corresponding to the transmission time interval structure format and indicates an association between a phase-tracking reference signal port and a demodulation reference signal port for the time domain window. The physical uplink channel manager 1235 may be configured as or otherwise support a means for receiving, from the UE within the time domain window, a set of multiple physical uplink channels having phase continuity using the association between the phase-tracking reference signal port and the demodulation reference signal port across the set of multiple physical uplink channels within the time domain window.

Additionally, or alternatively, the communications manager 1220 may support wireless communications at a network entity in accordance with examples as disclosed herein. The TTI structure format manager 1225 may be configured as or otherwise support a means for transmitting a control message that includes an indication of a transmission time interval structure format indicating a pattern of one or more uplink transmission time intervals, one or more downlink transmission time intervals, or any combination thereof, over a set of multiple transmission time intervals. The control signaling manager 1230 may be configured as or otherwise support a means for transmitting control signaling that schedules a first phase-tracking reference signal in a first time domain window for joint channel estimation corresponding to the transmission time interval structure format and that indicates a phase continuity configuration for the first time domain window. The physical uplink channel manager 1235 may be configured as or otherwise support a means for receiving a set of multiple physical uplink channels within the first time domain window in accordance with the phase continuity configuration.

Figure 13:
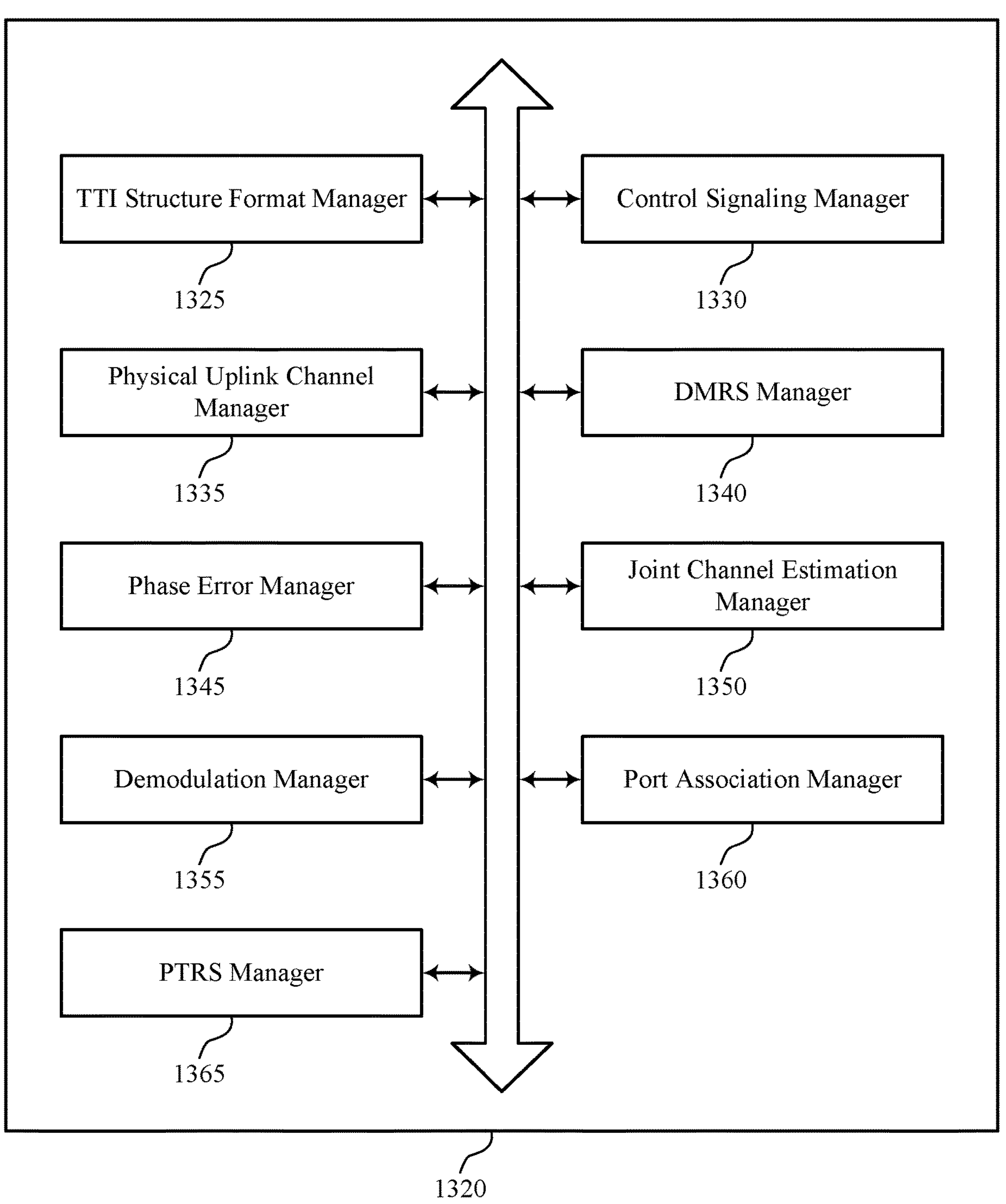
FIG. 13 shows a block diagram of a communications manager that supports phase tracking reference signals and demodulation reference signals for joint channel estimation in accordance with aspects of the present disclosure.

FIG. 13 shows a block diagram 1300 of a communications manager 1320 that supports phase tracking reference signals and demodulation reference signals for joint channel estimation in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of phase tracking reference signals and demodulation reference signals for joint channel estimation as described herein. For example, the communications manager 1320 may include a TTI structure format manager 1325, a control signaling manager 1330, a physical uplink channel manager 1335, a DMRS manager 1340, a phase error manager 1345, a joint channel estimation manager 1350, a demodulation manager 1355, a port association manager 1360, an PTRS manager 1365, or any combination thereof. Each of these components may communicate, directly or indirectly, with one another (e.g., via one or more buses).

The communications manager 1320 may support wireless communications at a network entity in accordance with examples as disclosed herein. The TTI structure format manager 1325 may be configured as or otherwise support a means for transmitting, to a UE, a control message that includes an indication of a transmission time interval structure format indicating a pattern of one or more uplink transmission time intervals, one or more downlink transmission time intervals, or any combination thereof, over a set of multiple transmission time intervals. The control signaling manager 1330 may be configured as or otherwise support a means for transmitting, to the UE, control signaling that schedules a first phase-tracking reference signal in a time domain window for joint channel estimation corresponding to the transmission time interval structure format and indicates an association between a phase-tracking reference signal port and a demodulation reference signal port for the time domain window. The physical uplink channel manager 1335 may be configured as or otherwise support a means for receiving, from the UE within the time domain window, a set of multiple physical uplink channels having phase continuity using the association between the phase-tracking reference signal port and the demodulation reference signal port across the set of multiple physical uplink channels within the time domain window.

In some examples, the DMRS manager 1340 may be configured as or otherwise support a means for receiving, from the UE, a set of multiple demodulation reference signals over a set of multiple different transmission time intervals within the time domain window. In some examples, the phase error manager 1345 may be configured as or otherwise support a means for estimating a phase error based on the first phase-tracking reference signal. In some examples, the joint channel estimation manager 1350 may be configured as or otherwise support a means for determining a joint channel estimate based on the estimated phase error and the set of multiple demodulation reference signals. In some examples, the demodulation manager 1355 may be configured as or otherwise support a means for demodulating the set of multiple physical uplink channels based on the joint channel estimate.

In some examples, to support transmitting the control signaling, the port association manager 1360 may be configured as or otherwise support a means for transmitting a downlink control message including an indication of the association between the phase-tracking reference signal port and the demodulation reference signal port for the time domain window.

In some examples, the port association manager 1360 may be configured as or otherwise support a means for receiving, using the association, a set of multiple demodulation reference signals via a demodulation reference signal port and a set of multiple phase-tracking reference signals via the phase-tracking reference signal port across the set of multiple physical uplink channels having phase continuity within the time domain window.

In some examples, the PTRS manager 1365 may be configured as or otherwise support a means for transmitting the control signaling including an indication of a bandwidth part associated with the set of multiple physical uplink channels. In some examples, the PTRS manager 1365 may be configured as or otherwise support a means for receiving, within the time domain window, a set of multiple phase-tracking reference signals including the first phase-tracking reference signal in accordance with a frequency domain density corresponding to the bandwidth part.

In some examples, the PTRS manager 1365 may be configured as or otherwise support a means for transmitting the control signaling including an indication of a modulation and coding scheme associated with the set of multiple physical uplink channels. In some examples, the PTRS manager 1365 may be configured as or otherwise support a means for receiving a set of multiple phase-tracking reference signals including the first phase-tracking reference signal in accordance with a time domain density corresponding to the modulation and coding scheme.

In some examples, to support transmitting the control signaling that schedules the first phase-tracking reference signal in the time domain window, the DMRS manager 1340 may be configured as or otherwise support a means for transmitting an indication of one or more demodulation reference signal occasions in the time domain window. In some examples, to support transmitting the control signaling that schedules the first phase-tracking reference signal in the time domain window, the PTRS manager 1365 may be configured as or otherwise support a means for receiving, within the time domain window, a set of multiple phase-tracking reference signals including the first phase-tracking reference signal in accordance with a phase-tracking reference signal repetition counter that is reset at each occasion of the one or more demodulation reference signal occasions.

In some examples, to support receiving the set of multiple physical uplink channels, the physical uplink channel manager 1335 may be configured as or otherwise support a means for receiving the set of multiple physical uplink channels as a set of multiple repetitions of a single physical uplink channel.

In some examples, to support receiving the set of multiple physical uplink channels, the physical uplink channel manager 1335 may be configured as or otherwise support a means for receiving the set of multiple physical uplink channels including a first physical uplink channel scheduled by a first downlink control information message and a second physical uplink channel scheduled by a second downlink control information message, where the first physical uplink channel is different than the second physical uplink channel.

In some examples, to support set of multiple physical uplink channels, the physical uplink channel manager 1335 may be configured as or otherwise support a means for one or more physical uplink shared channels, one or more physical uplink control channels, or a combination thereof.

Additionally, or alternatively, the communications manager 1320 may support wireless communications at a network entity in accordance with examples as disclosed herein. In some examples, the TTI structure format manager 1325 may be configured as or otherwise support a means for transmitting a control message that includes an indication of a transmission time interval structure format indicating a pattern of one or more uplink transmission time intervals, one or more downlink transmission time intervals, or any combination thereof, over a set of multiple transmission time intervals. In some examples, the control signaling manager 1330 may be configured as or otherwise support a means for transmitting control signaling that schedules a first phase-tracking reference signal in a first time domain window for joint channel estimation corresponding to the transmission time interval structure format and that indicates a phase continuity configuration for the first time domain window. In some examples, the physical uplink channel manager 1335 may be configured as or otherwise support a means for receiving a set of multiple physical uplink channels within the first time domain window in accordance with the phase continuity configuration.

In some examples, to support receiving the set of multiple physical uplink channels, the physical uplink channel manager 1335 may be configured as or otherwise support a means for receiving, within the first time domain window, one or more of the set of multiple physical uplink channels without phase continuity based on the phase continuity configuration indicating that phase continuity is disabled due to the first phase-tracking reference signal being scheduled within the first time domain window.

In some examples, the DMRS manager 1340 may be configured as or otherwise support a means for receiving a set of multiple demodulation reference signals associated with the set of multiple physical uplink channels and the first phase-tracking reference signal in the first time domain window.

In some examples, the physical uplink channel manager 1335 may be configured as or otherwise support a means for receiving, within a second time domain window for joint channel estimation corresponding to the transmission time interval structure format, two or more of the set of multiple physical uplink channels having phase continuity based on the phase continuity configuration indicating that phase continuity is enabled.

In some examples, the DMRS manager 1340 may be configured as or otherwise support a means for receiving, from the UE, a set of multiple demodulation reference signals over a set of multiple different transmission time intervals within the time domain window. In some examples, the joint channel estimation manager 1350 may be configured as or otherwise support a means for determining a joint channel estimate based on the set of multiple demodulation reference signals received. In some examples, the demodulation manager 1355 may be configured as or otherwise support a means for demodulating the set of multiple physical uplink channels based on the joint channel estimate.

Figure 14:
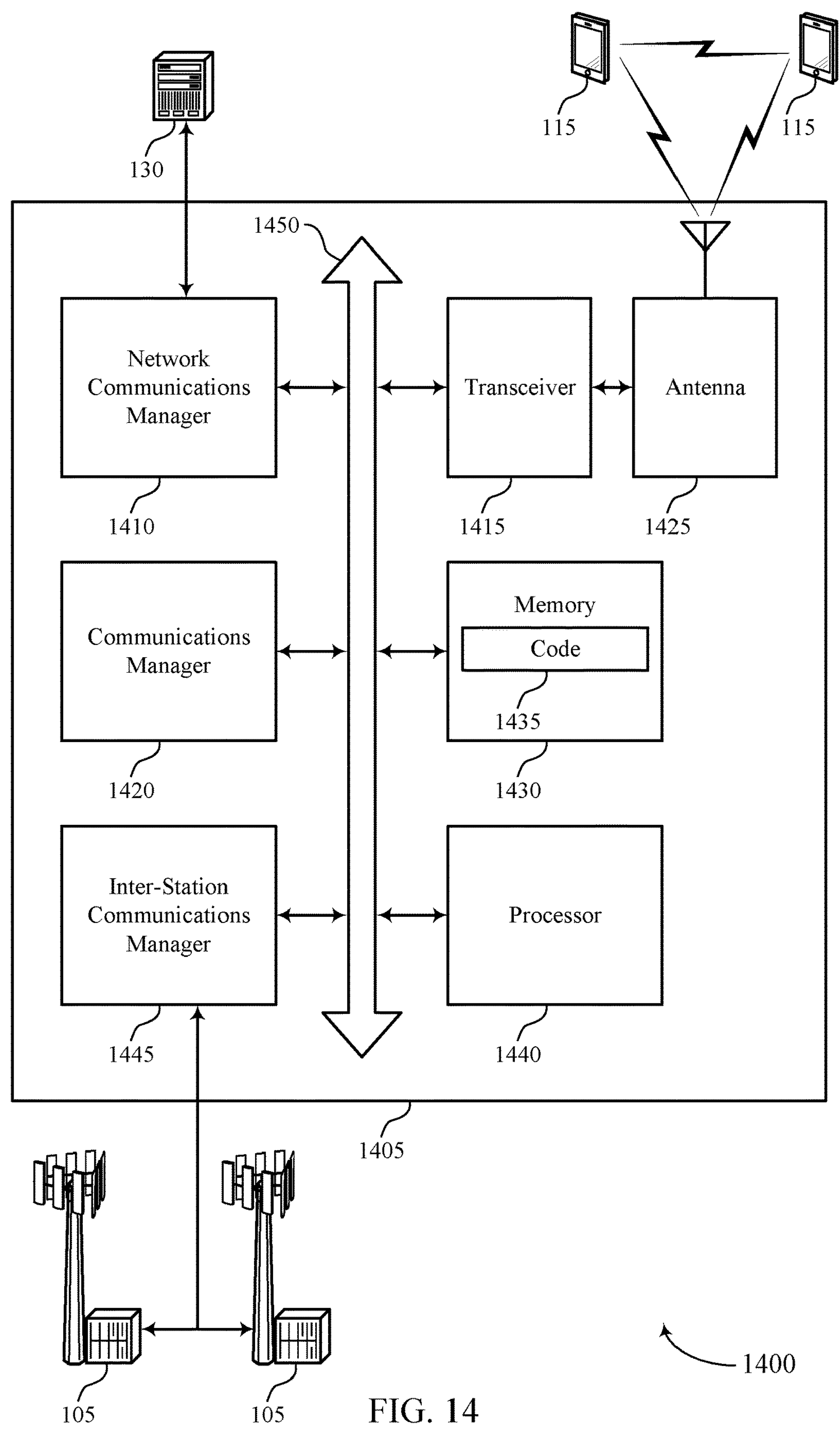
FIG. 14 shows a diagram of a system including a device that supports phase tracking reference signals and demodulation reference signals for joint channel estimation in accordance with aspects of the present disclosure.

FIG. 14 shows a diagram of a system 1400 including a device 1405 that supports phase tracking reference signals and demodulation reference signals for joint channel estimation in accordance with aspects of the present disclosure. The device 1405 may be an example of or include the components of a device 1105, a device 1205, or a network entity 105 as described herein. The device 1405 may communicate wirelessly with one or more network entities 105, UEs 115, or any combination thereof. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting phase tracking reference signals and demodulation reference signals for joint channel estimation). For example, the device 1405 or a component of the device 1405 may include a processor 1440 and memory 1430 coupled to the processor 1440, the processor 1440 and memory 1430 configured to perform various functions described herein.

The inter-station communications manager 1445 may manage communications with other network entities 105, and may include a controller or scheduler for controlling communications with UEs 115 in cooperation with other network entities 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between network entities 105.

The communications manager 1420 may support wireless communications at a network entity in accordance with examples as disclosed herein. For example, the communications manager 1420 may be configured as or otherwise support a means for transmitting, to a UE, a control message that includes an indication of a transmission time interval structure format indicating a pattern of one or more uplink transmission time intervals, one or more downlink transmission time intervals, or any combination thereof, over a set of multiple transmission time intervals. The communications manager 1420 may be configured as or otherwise support a means for transmitting, to the UE, control signaling that schedules a first phase-tracking reference signal in a time domain window for joint channel estimation corresponding to the transmission time interval structure format and indicates an association between a phase-tracking reference signal port and a demodulation reference signal port for the time domain window. The communications manager 1420 may be configured as or otherwise support a means for receiving, from the UE within the time domain window, a set of multiple physical uplink channels having phase continuity using the association between the phase-tracking reference signal port and the demodulation reference signal port across the set of multiple physical uplink channels within the time domain window.

Additionally, or alternatively, the communications manager 1420 may support wireless communications at a network entity in accordance with examples as disclosed herein. For example, the communications manager 1420 may be configured as or otherwise support a means for transmitting a control message that includes an indication of a transmission time interval structure format indicating a pattern of one or more uplink transmission time intervals, one or more downlink transmission time intervals, or any combination thereof, over a set of multiple transmission time intervals. The communications manager 1420 may be configured as or otherwise support a means for transmitting control signaling that schedules a first phase-tracking reference signal in a first time domain window for joint channel estimation corresponding to the transmission time interval structure format and that indicates a phase continuity configuration for the first time domain window. The communications manager 1420 may be configured as or otherwise support a means for receiving a set of multiple physical uplink channels within the first time domain window in accordance with the phase continuity configuration.

By including or configuring the communications manager 1420 in accordance with examples as described herein, the device 1405 may support techniques for joint channel estimation resulting in efficient determination of when to maintain phase continuity in a time domain window in which PTRSs are also scheduled. This may in turn result in improved system efficiency, improved reliability of uplink signaling, decreased system latency, and improved user experience.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of phase tracking reference signals and demodulation reference signals for joint channel estimation as described herein, or the processor 1440 and the memory 1430 may be otherwise configured to perform or support such operations.

FIG. 15 shows a flowchart illustrating a method 1500 that supports phase tracking reference signals and demodulation reference signals for joint channel estimation in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1505, the method may include receiving a control message that includes an indication of a transmission time interval structure format indicating a pattern of one or more uplink transmission time intervals, one or more downlink transmission time intervals, or any combination thereof, over a set of multiple transmission time intervals. The operations of 1505 may be performed in accordance with examples as disclosed herein. In some examples, aspects of the operations of 1505 may be performed by a TTI structure format manager 925 as described with reference to FIG. 9.

At 1510, the method may include receiving control signaling that schedules a first phase-tracking reference signal in a time domain window for joint channel estimation corresponding to the transmission time interval structure format and indicates an association between a phase-tracking reference signal port and a demodulation reference signal port for the time domain window. The operations of 1510 may be performed in accordance with examples as disclosed herein. In some examples, aspects of the operations of 1510 may be performed by a control signaling manager 930 as described with reference to FIG. 9.

At 1515, the method may include transmitting, within the time domain window, a set of multiple physical uplink channels having phase continuity using the association between the phase-tracking reference signal port and the demodulation reference signal port across the set of multiple physical uplink channels within the time domain window. The operations of 1515 may be performed in accordance with examples as disclosed herein. In some examples, aspects of the operations of 1515 may be performed by a physical uplink channel manager 935 as described with reference to FIG. 9.

FIG. 16 shows a flowchart illustrating a method 1600 that supports phase tracking reference signals and demodulation reference signals for joint channel estimation in accordance with aspects of the present disclosure. The operations of the method 1600 may be implemented by a network entity or its components as described herein. For example, the operations of the method 1600 may be performed by a network entity 105 as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 1605, the method may include transmitting, to a UE, a control message that includes an indication of a transmission time interval structure format indicating a pattern of one or more uplink transmission time intervals, one or more downlink transmission time intervals, or any combination thereof, over a set of multiple transmission time intervals. The operations of 1605 may be performed in accordance with examples as disclosed herein. In some examples, aspects of the operations of 1605 may be performed by a TTI structure format manager 1325 as described with reference to FIG. 13.

At 1610, the method may include transmitting, to the UE, control signaling that schedules a first phase-tracking reference signal in a time domain window for joint channel estimation corresponding to the transmission time interval structure format and indicates an association between a phase-tracking reference signal port and a demodulation reference signal port for the time domain window. The operations of 1610 may be performed in accordance with examples as disclosed herein. In some examples, aspects of the operations of 1610 may be performed by a control signaling manager 1330 as described with reference to FIG. 13.

At 1615, the method may include receiving, from the UE within the time domain window, a set of multiple physical uplink channels having phase continuity using the association between the phase-tracking reference signal port and the demodulation reference signal port across the set of multiple physical uplink channels within the time domain window. The operations of 1615 may be performed in accordance with examples as disclosed herein. In some examples, aspects of the operations of 1615 may be performed by a physical uplink channel manager 1335 as described with reference to FIG. 13.

Figure 17:
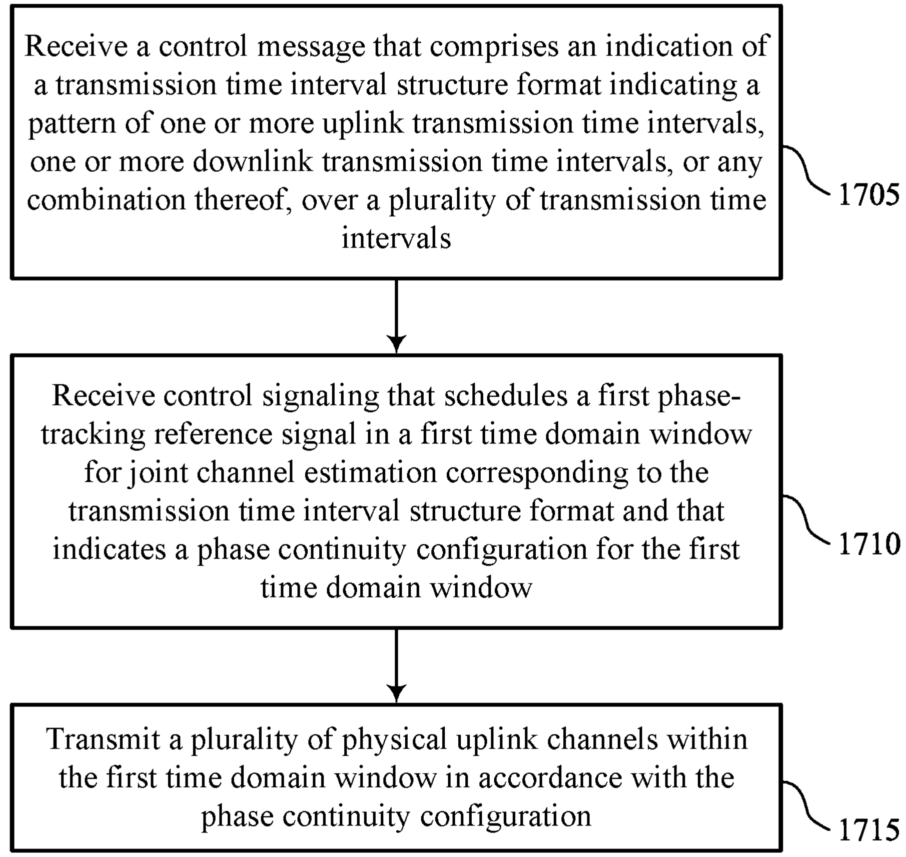

FIG. 17 shows a flowchart illustrating a method 1700 that supports phase tracking reference signals and demodulation reference signals for joint channel estimation in accordance with aspects of the present disclosure. The operations of the method 1700 may be implemented by a UE or its components as described herein. For example, the operations of the method 1700 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1705, the method may include receiving a control message that includes an indication of a transmission time interval structure format indicating a pattern of one or more uplink transmission time intervals, one or more downlink transmission time intervals, or any combination thereof, over a set of multiple transmission time intervals. The operations of 1705 may be performed in accordance with examples as disclosed herein. In some examples, aspects of the operations of 1705 may be performed by a TTI structure format manager 925 as described with reference to FIG. 9.

At 1710, the method may include receiving control signaling that schedules a first phase-tracking reference signal in a first time domain window for joint channel estimation corresponding to the transmission time interval structure format and that indicates a phase continuity configuration for the first time domain window. The operations of 1710 may be performed in accordance with examples as disclosed herein. In some examples, aspects of the operations of 1710 may be performed by a control signaling manager 930 as described with reference to FIG. 9.

At 1715, the method may include transmitting a set of multiple physical uplink channels within the first time domain window in accordance with the phase continuity configuration. The operations of 1715 may be performed in accordance with examples as disclosed herein. In some examples, aspects of the operations of 1715 may be performed by a physical uplink channel manager 935 as described with reference to FIG. 9.

Figure 18:
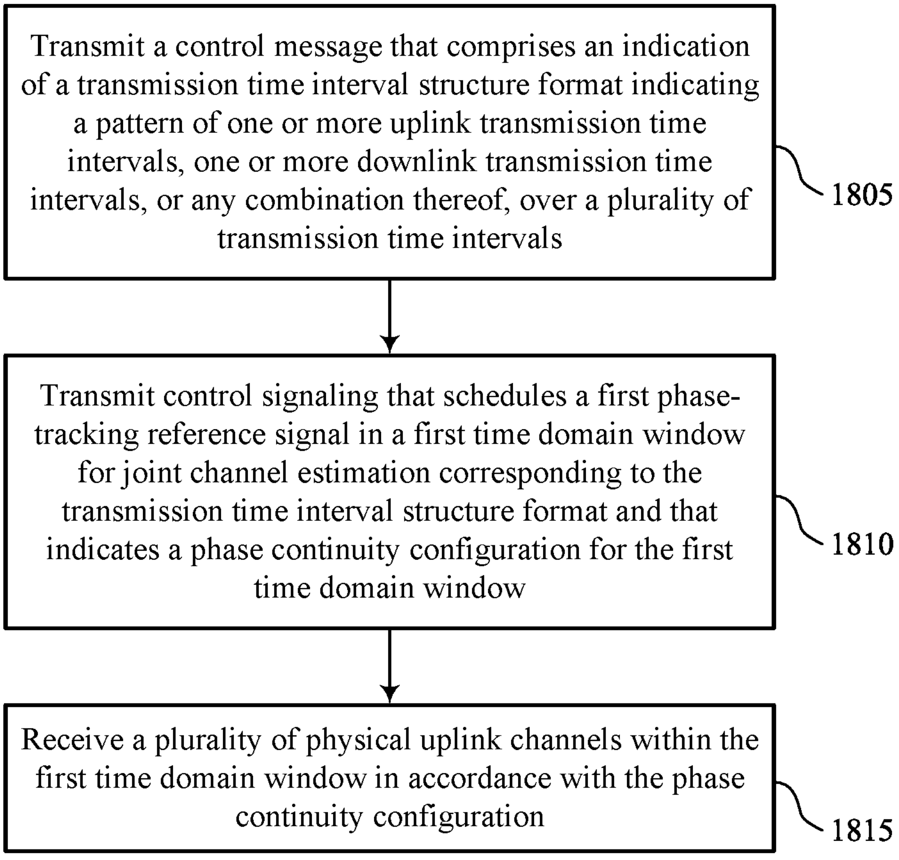

FIG. 18 shows a flowchart illustrating a method 1800 that supports phase tracking reference signals and demodulation reference signals for joint channel estimation in accordance with aspects of the present disclosure. The operations of the method 1800 may be implemented by a network entity or its components as described herein. For example, the operations of the method 1800 may be performed by a network entity 105 as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 1805, the method may include transmitting a control message that includes an indication of a transmission time interval structure format indicating a pattern of one or more uplink transmission time intervals, one or more downlink transmission time intervals, or any combination thereof, over a set of multiple transmission time intervals. The operations of 1805 may be performed in accordance with examples as disclosed herein. In some examples, aspects of the operations of 1805 may be performed by a TTI structure format manager 1325 as described with reference to FIG. 13.

At 1810, the method may include transmitting control signaling that schedules a first phase-tracking reference signal in a first time domain window for joint channel estimation corresponding to the transmission time interval structure format and that indicates a phase continuity configuration for the first time domain window. The operations of 1810 may be performed in accordance with examples as disclosed herein. In some examples, aspects of the operations of 1810 may be performed by a control signaling manager 1330 as described with reference to FIG. 13.

At 1815, the method may include receiving a set of multiple physical uplink channels within the first time domain window in accordance with the phase continuity configuration. The operations of 1815 may be performed in accordance with examples as disclosed herein. In some examples, aspects of the operations of 1815 may be performed by a physical uplink channel manager 1335 as described with reference to FIG. 13.

The following provides an overview of aspects of the present disclosure:

Aspect 1: A method for wireless communications at a user equipment, comprising: receiving a control message that comprises an indication of a transmission time interval structure format indicating a pattern of one or more uplink transmission time intervals, one or more downlink transmission time intervals, or any combination thereof, over a plurality of transmission time intervals; receiving control signaling that schedules a first phase-tracking reference signal in a time domain window for joint channel estimation corresponding to the transmission time interval structure format and indicates an association between a phase-tracking reference signal port and a demodulation reference signal port for the time domain window; and transmitting, within the time domain window, a plurality of physical uplink channels having phase continuity using the association between the phase-tracking reference signal port and the demodulation reference signal port across the plurality of physical uplink channels within the time domain window.

Aspect 2: The method of aspect 1, wherein receiving the control signaling comprises: receiving a downlink control information message comprising an indication of the association between the phase-tracking reference signal port and the demodulation reference signal port for the time domain window.

Aspect 3: The method of any of aspects 1 through 2, wherein the transmitting further comprises: transmitting, using the association, a plurality of demodulation reference signals via a demodulation reference signal port and a plurality of phase-tracking reference signals via the phase-tracking reference signal port across the plurality of physical uplink channels having phase continuity within the time domain window.

Aspect 4: The method of any of aspects 1 through 3, further comprising: receiving the control signaling comprising an indication of a bandwidth part associated with the plurality of physical uplink channels; and transmitting, within the time domain window, a plurality of phase-tracking reference signals including the first phase-tracking reference signal in accordance with a frequency domain density corresponding to the bandwidth part.

Aspect 5: The method of any of aspects 1 through 4, further comprising: receiving the control signaling comprising an indication of a modulation and coding scheme associated with the plurality of physical uplink channels; and transmitting a plurality of phase-tracking reference signals including the first phase-tracking reference signal in accordance with a time domain density corresponding to the modulation and coding scheme.

Aspect 6: The method of any of aspects 1 through 5, wherein receiving the control signaling that schedules the first phase-tracking reference signal in the time domain window comprises: receiving an indication of one or more demodulation reference signal occasions in the time domain window; and transmitting, within the time domain window, a plurality of phase-tracking reference signals including the first phase-tracking reference signal in accordance with a phase-tracking reference signal repetition counter that is reset at each occasion of the one or more demodulation reference signal occasions.

Aspect 7: The method of any of aspects 1 through 6, wherein transmitting the plurality of physical uplink channels comprises: transmitting the plurality of physical uplink channels as a plurality of repetitions of a same physical uplink channel.

Aspect 8: The method of any of aspects 1 through 7, wherein transmitting the plurality of physical uplink channels comprises: transmitting the plurality of physical uplink channels comprising a first physical uplink channel scheduled by a first downlink control information message and a second physical uplink channel scheduled by a second downlink control information message, wherein the first physical uplink channel is different than the second physical uplink channel.

Aspect 9: The method of any of aspects 1 through 8, wherein the plurality of physical uplink channels comprises:

one or more physical uplink shared channels, one or more physical uplink control channels, or a combination thereof.

Aspect 10: The method of any of aspects 1 through 9, further comprising: identifying a plurality of time domain windows for joint channel estimation based at least in part on the transmission time interval structure format.

Aspect 11: A method for wireless communications at a network entity, comprising: transmitting, to a UE, a control message that comprises an indication of a transmission time interval structure format indicating a pattern of one or more uplink transmission time intervals, one or more downlink transmission time intervals, or any combination thereof, over a plurality of transmission time intervals; transmitting, to the UE, control signaling that schedules a first phase-tracking reference signal in a time domain window for joint channel estimation corresponding to the transmission time interval structure format and indicates an association between a phase-tracking reference signal port and a demodulation reference signal port for the time domain window; and receiving, from the UE within the time domain window, a plurality of physical uplink channels having phase continuity using the association between the phase-tracking reference signal port and the demodulation reference signal port across the plurality of physical uplink channels within the time domain window.

Aspect 12: The method of aspect 11, further comprising: receiving, from the UE, a plurality of demodulation reference signals over a plurality of different transmission time intervals within the time domain window; estimating a phase error based at least in part on the first phase-tracking reference signal; determining a joint channel estimate based at least in part on the estimated phase error and the plurality of demodulation reference signals; and demodulating the plurality of physical uplink channels based at least in part on the joint channel estimate.

Aspect 13: The method of any of aspects 11 through 12, wherein transmitting the control signaling comprises: transmitting a downlink control message comprising an indication of the association between the phase-tracking reference signal port and the demodulation reference signal port for the time domain window.

Aspect 14: The method of aspect 13, further comprising: receiving, using the association, a plurality of demodulation reference signals via a demodulation reference signal port and a plurality of phase-tracking reference signals via the phase-tracking reference signal port across the plurality of physical uplink channels having phase continuity within the time domain window.

Aspect 15: The method of any of aspects 11 through 14, further comprising: transmitting the control signaling comprising an indication of a bandwidth part associated with the plurality of physical uplink channels; and receiving, within the time domain window, a plurality of phase-tracking reference signals including the first phase-tracking reference signal in accordance with a frequency domain density corresponding to the bandwidth part.

Aspect 16: The method of any of aspects 11 through 15, further comprising: transmitting the control signaling comprising an indication of a modulation and coding scheme associated with the plurality of physical uplink channels; and receiving a plurality of phase-tracking reference signals including the first phase-tracking reference signal in accordance with a time domain density corresponding to the modulation and coding scheme.

Aspect 17: The method of any of aspects 11 through 16, wherein transmitting the control signaling that schedules the first phase-tracking reference signal in the time domain window comprises: transmitting an indication of one or more demodulation reference signal occasions in the time domain window; and receiving, within the time domain window, a plurality of phase-tracking reference signals including the first phase-tracking reference signal in accordance with a phase-tracking reference signal repetition counter that is reset at each occasion of the one or more demodulation reference signal occasions.

Aspect 18: The method of any of aspects 11 through 17, wherein receiving the plurality of physical uplink channels comprises: receiving the plurality of physical uplink channels as a plurality of repetitions of a single physical uplink channel.

Aspect 19: The method of any of aspects 11 through 18, wherein receiving the plurality of physical uplink channels comprises: receiving the plurality of physical uplink channels comprising a first physical uplink channel scheduled by a first downlink control information message and a second physical uplink channel scheduled by a second downlink control information message, wherein the first physical uplink channel is different than the second physical uplink channel.

Aspect 20: The method of any of aspects 11 through 19, wherein the plurality of physical uplink channels comprises: one or more physical uplink shared channels, one or more physical uplink control channels, or a combination thereof.

Aspect 21: A method for wireless communications at a UE, comprising: receiving a control message that comprises an indication of a transmission time interval structure format indicating a pattern of one or more uplink transmission time intervals, one or more downlink transmission time intervals, or any combination thereof, over a plurality of transmission time intervals; receiving control signaling that schedules a first phase-tracking reference signal in a first time domain window for joint channel estimation corresponding to the transmission time interval structure format and that indicates a phase continuity configuration for the first time domain window; and transmitting a plurality of physical uplink channels within the first time domain window in accordance with the phase continuity configuration.

Aspect 22: The method of aspect 21, wherein transmitting the plurality of physical uplink channels further comprises: transmitting, within the first time domain window, one or more of the plurality of physical uplink channels without phase continuity based at least in part on the phase continuity configuration indicating that phase continuity is disabled due to the first phase-tracking reference signal being scheduled within the first time domain window.

Aspect 23: The method of aspect 22, further comprising: transmitting a plurality of demodulation reference signals associated with the plurality of physical uplink channels and the one or more phase-tracking reference signals in the first time domain window.

Aspect 24: The method of any of aspects 21 through 23, further comprising: transmitting, within a second time domain window for joint channel estimation corresponding to the transmission time interval structure format, two or more of the plurality of physical uplink channels having phase continuity based at least in part on the phase continuity configuration indicating that phase continuity is enabled.

Aspect 25: The method of aspect 24, further comprising: transmitting a plurality of demodulation reference signals associated with the plurality of physical uplink channels in the second time domain window.

Aspect 26: A method for wireless communications at a network entity, comprising: transmitting a control message that comprises an indication of a transmission time interval structure format indicating a pattern of one or more uplink transmission time intervals, one or more downlink transmission time intervals, or any combination thereof, over a plurality of transmission time intervals; transmitting control signaling that schedules a first phase-tracking reference signal in a first time domain window for joint channel estimation corresponding to the transmission time interval structure format and that indicates a phase continuity configuration for the first time domain window; and receiving a plurality of physical uplink channels within the first time domain window in accordance with the phase continuity configuration.

Aspect 27: The method of aspect 26, wherein receiving the plurality of physical uplink channels further comprises: receiving, within the first time domain window, one or more of the plurality of physical uplink channels without phase continuity based at least in part on the phase continuity configuration indicating that phase continuity is disabled due to the first phase-tracking reference signal being scheduled within the first time domain window.

Aspect 28: The method of aspect 27, further comprising: receiving a plurality of demodulation reference signals associated with the plurality of physical uplink channels and the one or more phase-tracking reference signals in the first time domain window.

Aspect 29: The method of any of aspects 26 through 28, further comprising: receiving, within a second time domain window for joint channel estimation corresponding to the transmission time interval structure format, two or more of the plurality of physical uplink channels having phase continuity based at least in part on the phase continuity configuration indicating that phase continuity is enabled.

Aspect 30: The method of aspect 29, further comprising: receiving, from the UE, a plurality of demodulation reference signals over a plurality of different transmission time intervals within the time domain window; determining a joint channel estimate based at least in part on the plurality of demodulation reference signals received; and demodulating the plurality of physical uplink channels based at least in part on the joint channel estimate.

Aspect 31: An apparatus for wireless communications at a user equipment, comprising a processor; memory coupled with the processor; and instructions stored in the memory and executable by the processor to cause the apparatus to perform a method of any of aspects 1 through 10.

Aspect 32: An apparatus for wireless communications at a user equipment, comprising at least one means for performing a method of any of aspects 1 through 10.

Aspect 33: A non-transitory computer-readable medium storing code for wireless communications at a user equipment, the code comprising instructions executable by a processor to perform a method of any of aspects 1 through 10.

Aspect 34: An apparatus for wireless communications at a network entity, comprising a processor; memory coupled with the processor; and instructions stored in the memory and executable by the processor to cause the apparatus to perform a method of any of aspects 11 through 20.

Aspect 35: An apparatus for wireless communications at a network entity, comprising at least one means for performing a method of any of aspects 11 through 20.

Aspect 36: A non-transitory computer-readable medium storing code for wireless communications at a network entity, the code comprising instructions executable by a processor to perform a method of any of aspects 11 through 20.

Aspect 37: An apparatus for wireless communications at a UE, comprising a processor; memory coupled with the processor; and instructions stored in the memory and executable by the processor to cause the apparatus to perform a method of any of aspects 21 through 25.

Aspect 38: An apparatus for wireless communications at a UE, comprising at least one means for performing a method of any of aspects 21 through 25.

Aspect 39: A non-transitory computer-readable medium storing code for wireless communications at a UE, the code comprising instructions executable by a processor to perform a method of any of aspects 21 through 25.

Aspect 40: An apparatus for wireless communications at a network entity, comprising a processor; memory coupled with the processor; and instructions stored in the memory and executable by the processor to cause the apparatus to perform a method of any of aspects 26 through 30.

Aspect 41: An apparatus for wireless communications at a network entity, comprising at least one means for performing a method of any of aspects 26 through 30.

Aspect 42: A non-transitory computer-readable medium storing code for wireless communications at a network entity, the code comprising instructions executable by a processor to perform a method of any of aspects 26 through 30.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications by a user equipment (UE), comprising:

receiving a control message that indicates transmission time interval structure information;

receiving control signaling that indicates phase continuity is disabled across physical uplink channels within one or more time domain windows defined by the transmission time interval structure information, wherein the control signaling indicates phase continuity is disabled based at least in part on a phase-tracking reference signal being scheduled within the one or more time domain windows; and transmitting, within a time domain window of the one or more time domain windows, one or more of a plurality of physical uplink channels without maintaining phase continuity based at least in part on the control signaling.

2. The method of claim 1, further comprising:

transmitting a plurality of demodulation reference signals associated with the plurality of physical uplink channels and the phase-tracking reference signal in the time domain window.

3. The method of claim 1, further comprising:

transmitting, within a second time domain window corresponding to a transmission time interval structure format, two or more of the plurality of physical uplink channels having phase continuity based at least in part on phase continuity being enabled within the second time domain window, wherein the phase continuity is enabled within the second time domain window based at least in part on an absence of a respective phase-tracking reference signal in the second time domain window.

4. The method of claim 3, further comprising:

transmitting a plurality of demodulation reference signals associated with the plurality of physical uplink channels in the second time domain window.

5. The method of claim 1, wherein the transmission time interval structure information indicates a pattern of one or more uplink transmission time intervals, one or more downlink transmission time intervals, or any combination thereof, wherein whether to maintain phase continuity across one or more physical uplink channels is associated with the transmission time interval structure information.

6. A method for wireless communications by a network entity, comprising:

transmitting a control message that indicates transmission time interval structure information;

transmitting control signaling that indicates phase continuity is disabled across physical uplink channels within one or more time domain windows defined by the transmission time interval structure information, wherein the control signaling indicates phase continuity is disabled based at least in part a phase-tracking reference signal being scheduled within the one or more time domain windows; and receiving, within a time domain window of the one or more time domain windows, one or more of a plurality of physical uplink channels while phase continuity is disabled based at least in part on the control signaling.

7. The method of claim 6, further comprising:

receiving a plurality of demodulation reference signals associated with the plurality of physical uplink channels and the phase-tracking reference signal in the time domain window.

8. The method of claim 6, further comprising:

receiving, within a second time domain window corresponding to a transmission time interval structure format, two or more of the plurality of physical uplink channels having phase continuity based at least in part on phase continuity being enabled within the second time domain window, wherein the phase continuity is enabled within the second time domain window based at least in part on an absence of a respective phase-tracking reference signal in the second time domain window.

9. The method of claim 8, further comprising:

receiving, from a user equipment (UE), a plurality of demodulation reference signals over a plurality of different transmission time intervals within the second time domain window; and demodulating the plurality of physical uplink channels based at least in part on a joint channel estimate, the joint channel estimate being based at least in part on the plurality of demodulation reference signals.

10. The method of claim 6, wherein the transmission time interval structure information indicates a pattern of one or more uplink transmission time intervals, one or more downlink transmission time intervals, or any combination thereof, wherein whether to maintain phase continuity across one or more physical uplink channels is associated with the transmission time interval structure information.

11. A user equipment (UE), comprising:

a transceiver;

one or more memories storing processor-executable code; and one or more processors individually or collectively operable to execute the code to cause the UE to:

receive, via the transceiver, a control message that indicates transmission time interval structure information;

receive, via the transceiver, control signaling that indicates phase continuity is disabled across physical uplink channels within one or more time domain windows defined by the transmission time interval structure information, wherein the control signaling indicates phase continuity is disabled based at least in part on a phase-tracking reference signal being scheduled within the one or more time domain windows; and transmit, via the transceiver and within a time domain window of the one or more time domain windows, one or more of a plurality of physical uplink channels without maintaining phase continuity based at least in part on the control signaling.

12. The UE of claim 11, wherein the one or more processors are individually or collectively further operable to execute the code to cause the UE to:

transmit, via the transceiver, a plurality of demodulation reference signals associated with the plurality of physical uplink channels and the phase-tracking reference signal in the time domain window.

13. The UE of claim 11, wherein the one or more processors are individually or collectively further operable to execute the code to cause the UE to:

transmit, via the transceiver and within a second time domain window for joint channel estimation corresponding to a transmission time interval structure format, two or more of the plurality of physical uplink channels having phase continuity based at least in part on phase continuity being enabled within the second time domain window, wherein the phase continuity is enabled within the second time domain window based at least in part on an absence of a respective phase-tracking reference signal in the second time domain window.

14. The UE of claim 13, wherein the one or more processors are individually or collectively further operable to execute the code to cause the UE to:

transmit, via the transceiver, a plurality of demodulation reference signals associated with the plurality of physical uplink channels in the second time domain window.

15. The UE of claim 11, wherein the transmission time interval structure information indicates a pattern of one or more uplink transmission time intervals, one or more downlink transmission time intervals, or any combination thereof, wherein whether to maintain phase continuity across one or more physical uplink channels is associated with the transmission time interval structure information.

16. A network entity, comprising:

a transceiver;

one or more memories storing processor-executable code; and one or more processors individually or collectively operable to execute the code to cause the network entity to:

transmit, via the transceiver, a control message that indicates transmission time interval structure information;

transmit, via the transceiver, control signaling that indicates phase continuity is disabled across physical uplink channels within one or more time domain windows defined by the transmission time interval structure information, wherein the control signaling indicates phase continuity is disabled based at least in part on a phase-tracking reference signal being scheduled within the one or more time domain windows; and receive, via the transceiver and within a time domain window of the one or more time domain windows, one or more of a plurality of physical uplink channels while phase continuity is disabled based at least in part on the control signaling.

17. The network entity of claim 16, wherein the one or more processors are individually or collectively further operable to execute the code to cause the network entity to:

receive, via the transceiver, a plurality of demodulation reference signals associated with the plurality of physical uplink channels and the phase-tracking reference signal in the time domain window.

18. The network entity of claim 16, wherein the one or more processors are individually or collectively further operable to execute the code to cause the network entity to:

receive, via the transceiver and within a second time domain window for joint channel estimation corresponding to a transmission time interval structure format, two or more of the plurality of physical uplink channels having phase continuity based at least in part on phase continuity being enabled within the second time domain window, wherein the phase continuity is enabled within the second time domain window based at least in part on an absence of a respective phase-tracking reference signal in the second time domain window.

19. The network entity of claim 18, wherein the one or more processors are individually or collectively further operable to execute the code to cause the network entity to:

receive, from a user equipment (UE) via the transceiver, a plurality of demodulation reference signals over a plurality of different transmission time intervals within the second time domain window; and demodulate the plurality of physical uplink channels based at least in part on a joint channel estimate, the joint channel estimate being based at least in part on the plurality of demodulation reference signals.

20. The network entity of claim 16, wherein the transmission time interval structure information indicates a pattern of one or more uplink transmission time intervals, one or more downlink transmission time intervals, or any combination thereof, wherein whether to maintain phase continuity across one or more physical uplink channels is associated with the transmission time interval structure information.

* * * * *